US012786811B2

(12) United States Patent
Jung et al.

(10) Patent No.: US 12,786,811 B2

(45) Date of Patent: Nov. 3, 2026

(54) METHOD AND APPARATUS FOR MEASUREMENT REPORTING OF UNCREWED AERIAL VEHICLE TERMINAL IN NON-TERRESTRIAL NETWORK

(71) Applicant: Samsung Electronics Co., Ltd., Gyeonggi-do (KR)

(72) Inventors: Sangyeob Jung, Gyeonggi-do (KR); Anil Agiwal, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 433 days.

(21) Appl. No.: 18/473,642

(22) Filed: Sep. 25, 2023

(65) Prior Publication Data

US 2024/0107387 A1 Mar. 28, 2024

(30) Foreign Application Priority Data

Sep. 28, 2022 (KR) ........................ 10-2022-0123656

(51) Int. Cl.
*H04W 36/00* (2009.01)
*H04W 84/06* (2009.01)

(52) U.S. Cl.
CPC . *H04W 36/0058* (2018.08); *H04W 36/00837* (2018.08); *H04W 84/06* (2013.01)

(58) Field of Classification Search
CPC ....... H04W 36/0058; H04W 36/00837; H04W 84/06; H04W 8/24; H04W 36/16; H04W 36/0088; H04W 24/10; H04B 7/18513
See application file for complete search history.

(56) References Cited

U.S. PATENT DOCUMENTS

2018/0332492 A1* 11/2018 Wang .................... H04W 24/10
2020/0023999 A1 1/2020 Chae et al.
(Continued)

FOREIGN PATENT DOCUMENTS

WO WO-2020060075 A1 * 3/2020 ............ H04W 16/28

OTHER PUBLICATIONS

Huawei, HiSilicon, "Potential Issues and Enhancements for UAV Measurements", R2-2210504, 3GPPTSG-RAN WG2 Meeting #119bis-e, Oct. 10-19, 2022, 3 pages.
(Continued)

*Primary Examiner* — Ricky Q Ngo
*Assistant Examiner* — Kabir U Jahangir
(74) *Attorney, Agent, or Firm* — The Farrell Law Firm, P.C.

(57) ABSTRACT

The present disclosure relates to a 5G communication system or a 6G communication system for supporting higher data rates beyond a 4G communication system such as long term evolution (LTE). Methods and devices are provided in a wireless communication system. Configuration information on a measurement report is received from a base station. The configuration information includes first information on a first number of triggering cells. A first measurement report for at least one first cell fulfilling an entry condition is transmitted to the base station, in case that a second number of the at least one first cell is larger than or equal to the first number of triggering cells. A second measurement report for at least one second cell fulfilling a leaving condition is transmitted to the base station. The at least one second cell is in the first measurement report.

16 Claims, 14 Drawing Sheets

(56) References Cited

U.S. PATENT DOCUMENTS

| | | | | |
|---|---|---|---|---|
| 2021/0168670 | A1* | 6/2021 | Min | H04W 36/0088 |
| 2024/0064598 | A1* | 2/2024 | Bergström | G08G 5/26 |

OTHER PUBLICATIONS

LG Electronics Inc., "Measurement Report Enhancement", R2-2208335, 3GPP TSG-RAN WG2 Meeting #119-e, Aug. 17-26, 2022, 4 pages.

Lenovo, Motorola Mobility, "Measurement Enhancement for NR UAV", R2-2207715, 3GPP TSG-RAN WG2 Meeting #119-e, Aug. 17-26, 2022, 6 pages.

Nokia et al., "On Measurement Reporting Enhancements for UAVs—LTE Baseline in NR Framework", R2-2207329, 3GPP TSG-RAN WG2 Meeting #119-e, Aug. 17-26, 2022, 5 pages.

European Search Report dated Feb. 27, 2024 issued in counterpart application No. 23200108.1-1206, 14 pages.

European Search Report dated Dec. 10, 2025 issued in counterpart application No. 23200108.1-1206, 8 pages.

* cited by examiner

METHOD AND APPARATUS FOR MEASUREMENT REPORTING OF UNCREWED AERIAL VEHICLE TERMINAL IN NON-TERRESTRIAL NETWORK

CROSS-REFERENCE TO RELATED APPLICATION(S)

This application is based on and claims priority under 35 U.S.C. § 119 to Korean Patent Application No. 10-2022-0123656, filed on Sep. 28, 2022, in the Korean Intellectual Property Office, the disclosure of which is incorporated herein by reference in its entirety.

BACKGROUND

1. Field

The disclosure relates to the operation of a terminal and a base station in a wireless communication system and, more particularly, to a method and an apparatus for measurement reporting of an uncrewed aerial vehicle terminal in a non-terrestrial network.

2. Description of Related Art

Considering the development of wireless communication from generation to generation, the technologies have been developed mainly for services targeting humans, such as voice calls, multimedia services, and data services. Following the commercialization of 5G (5th generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, Radio Frequency (RF) elements, antennas, novel waveforms having a better coverage than Orthogonal Frequency Division Multiplexing (OFDM), beamforming and massive Multiple-input Multiple-Output (MIMO), Full Dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, Orbital Angular Momentum (OAM), and Reconfigurable Intelligent Surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, High-Altitude Platform Stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of Artificial Intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as Mobile Edge Computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive eXtended Reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

SUMMARY

Disclosed embodiments are to provide an apparatus and a method for effectively performing measurement reporting by an uncrewed aerial vehicle in a wireless communication system.

According to an embodiment, a method performed by a user equipment (UE) in a wireless communication system, the method comprising receiving, from a base station, configuration information on a measurement report including information on a number of triggering cells, transmitting, to the base station, a first measurement report for at least one first cell fulfilling an entry condition, in case that a number of the at least one first cell is larger than or equal to the number of triggering cells, and transmitting, to the base station, a second measurement report for at least one second cell fulfilling a leaving condition, wherein the at least one second cell fulfilling the leaving condition is a cell which was included in the first measurement report.

According to an embodiment, a method performed by a base station in a wireless communication system, the method comprising transmitting, to a user equipment (UE), configuration information on a measurement report including information on a number of triggering cells, receiving, from the UE, a first measurement report for at least one first cell fulfilling an entry condition, in case that a number of the at least one first cell is larger than or equal to the number of triggering cells, and receiving, from the UE, a second measurement report for at least one second cell fulfilling a leaving condition, wherein at least one second cell fulfilling the leaving condition is a cell which was included in the first measurement report.

According to an embodiment, a UE in a wireless communication system is provided. The UE includes a transceiver, and at least one processor coupled with the transceiver. The at least one processor is configured to receive, from a base station, configuration information on a measurement report including information on a number of triggering cells, transmit, to the base station, a first measurement report for at least one first cell fulfilling an entry condition, in case that a number of the at least one first cell is larger than or equal to the number of triggering cells, transmit, to the base station, a second measurement report for at least one second cell fulfilling a leaving condition, wherein the at least one second cell fulfilling the leaving condition is a cell which was included in the first measurement report.

According to an embodiment, a base station in a wireless communication system is provided. The base station includes a transceiver, and at least one processor coupled with the transceiver. The at least one processor is configured to transmit, to a user equipment (UE), configuration information on a measurement report including information on a number of triggering cells, receive, from the UE, a first measurement report for at least one first cell fulfilling an entry condition, in case that a number of the at least one first cell is larger than or equal to the number of triggering cells, receive, from the UE, a second measurement report for at least one second cell fulfilling a leaving condition, wherein at least one second cell fulfilling the leaving condition is a cell which was included in the first measurement report.

The disclosure provides an apparatus and a method for effectively performing measurement reporting by an uncrewed aerial vehicle in a wireless communication system.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
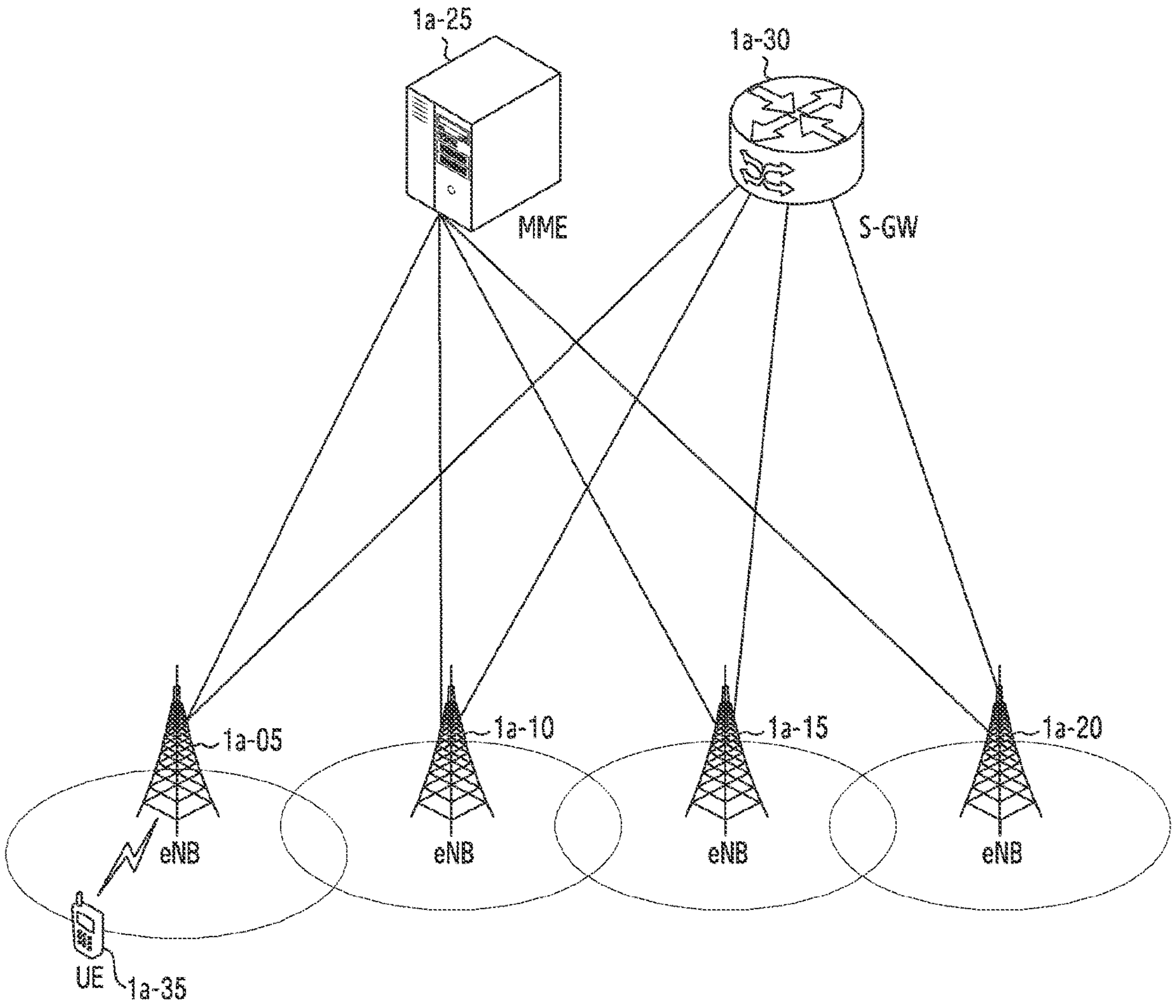
FIG. 1A is a diagram illustrating a structure of an LTE system, according to an embodiment.

Embodiments of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. A unit may be constructed either to be stored in an addressable storage medium or to execute one or more processors. Therefore, a unit includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by a unit may be either combined into a smaller number of elements, or a unit, or divided into a larger number of elements, or a unit. Moreover, the elements and units or may be implemented to reproduce one or more CPUs within a device or a security multimedia card. Furthermore, a unit may include one or more processors.

In the following description, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

In the following description, the terms "physical channel" and "signal" may be interchangeably used with the term "data" or "control signal". For example, a physical downlink shared channel (PDSCH) refers to a physical channel over which data is transmitted, but the PDSCH may be used to refer to data. That is, the expression "transmit a physical channel" may be construed as having the same meaning as "transmit data or a signal over a physical channel".

Herein, higher signaling may mean a signal transmission method in which a base station transmits a signal to an electronic device by using a downlink data channel in a physical layer or an electronic device transmits a signal to a base station by using an uplink data channel in a physical layer. The higher signaling may be understood as radio resource control (RRC) signaling or a media access control (MAC) control element (CE).

In the following description, terms and names defined in the 3rd generation partnership project long term evolution (3GPP LTE) standards will be used for the sake of descriptive convenience. However, the disclosure is not limited by these terms and names, and may be applied in the same way to systems that conform other standards Herein, a base station (BS) is an entity that allocates resources to terminals, and may be at least one of a gNode B (gNB), an eNode B (eNB), a Node B, a wireless access unit, a base station controller, and a node on a network. In the disclosure, the term "eNB" may be interchangeably used with the term "gNB". That is, a base station described as "eNB" may indicate "gNB". A terminal may include a user equipment (UE), a mobile station (MS), a cellular phone, a smartphone, a computer, or a multimedia system capable of performing communication functions. Examples of the base station and the terminal are not limited thereto.

Embodiments of the disclosure may be applied to the 3GPP NR (5G mobile communication standards). The disclosure may be applied to intelligent services (e.g., smart homes, smart buildings, smart cities, smart cars or connected cars, healthcare, digital education, retail business, security and safety-related services, etc.) on the basis of 5G communication technology and Internet of things (IoT)-related technology.

A wireless communication system is advancing to a broadband wireless communication system for providing high-speed and high-quality packet data services using communication standards, such as high-speed packet access (HSPA) of 3GPP, long-term evolution (LTE) or evolved universal terrestrial radio access (E-UTRA), LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an OFDM scheme in a downlink (DL) and employs a single carrier frequency division multiple access (SC-FDMA) scheme in an uplink (UL). The uplink indicates a radio link through which a UE (or an MS) transmits data or control signals to a BS (or eNode B), and the downlink indicates a radio link through which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include, for example, enhanced mobile broadband (eMBB) communication, massive machine-type communication (mMTC), ultra-reliability low-latency communication (URLLC), and the like.

According to some embodiments, eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced MIMO transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the IoT in the 5G communication system. mMTC has requirements, such as support of connection of a large number of UEs in a cell, enhancement coverage of UEs, improved battery time, a reduction in the cost of a UE, and the like, in order to effectively provide the IoT. Since the IoT provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time, such as 10 to 15 years, because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also may require a design for assigning a large number of resources in a frequency band in order to secure reliability of a communication link.

The above-described three services considered in the 5G communication system (i.e., eMBB, URLLC, and mMTC) may be multiplexed and transmitted in a single system. In order to satisfy different requirements of the respective services, different transmission/reception techniques and transmission/reception parameters may be used between the services. However, the above mMTC, URLLC, and eMBB are merely examples of different types of services, and service types to which embodiments of the disclosure are applied are not limited to the above examples.

Furthermore, in the following description, LTE, LTE-A, LTE Pro, 5G (or NR), or 6G systems will be described by way of example, but the embodiments of the disclosure may also be applied to other communication systems having similar technical backgrounds or channel types. In addition, based on determinations by those skilled in the art, the embodiments of the disclosure may also be applied to other communication systems through some modifications without significantly departing from the scope of the disclosure.

FIG. 1A is a diagram illustrating the structure of an LTE system, according to an embodiment.

Referring to FIG. 1A, as illustrated, the wireless access network of the LTE system may include next-generation base stations (eNB, Node B, or base station) 1*a*-05, 1*a*-10, 1*a*-15, and 1*a*-20, a mobility management entity (MME) 1*a*-25, and a serving gateway (S-GW) 1*a*-30. A UE or terminal 1*a*-35 may be connected to an external network through the ENB 1*a*-05, 1*a*-10, 1*a*-15, and 1*a*-20 and the S-GW 1*a*-30.

In FIG. 1A, the ENBs 1*a*-05, 1*a*-10, 1*a*-15, and 1*a*-20 may correspond to the existing node B of a UMTS system. The ENB 1*a*-05 may be connected to the UE 1*a*-35 by a wireless channel, and may perform a more complicated role than the existing Node B. In the LTE system, since all user traffic including real-time services such as voice over IP (VoIP), carried over the Internet protocol, are served through a shared channel, a device is required to perform scheduling by collecting status information such as buffer status, available transmission power status, and channel status of UEs, and the ENBs 1*a*-05, 1*a*-10, 1*a*-15, and 1*a*-20 may be responsible therefor. One ENB may usually control multiple cells. For example, in order to realize a transmission rate of 100 Mbps, the LTE system may use OFDM in, for example, a 20 MHz bandwidth as a radio access technology. In addition, an adaptive modulation and coding (AMC) method may be applied to determine the modulation scheme and the channel-coding rate according to the state of a channel used by a terminal. The S-GW 1*a*-30 is a device that provides a data bearer, and may generate or remove a data bearer under the control of the MME 1*a*-25. The MME is a device that is responsible for various control functions as well as mobility management functions for the terminals, and may be connected to multiple base stations.

Figure 1B:
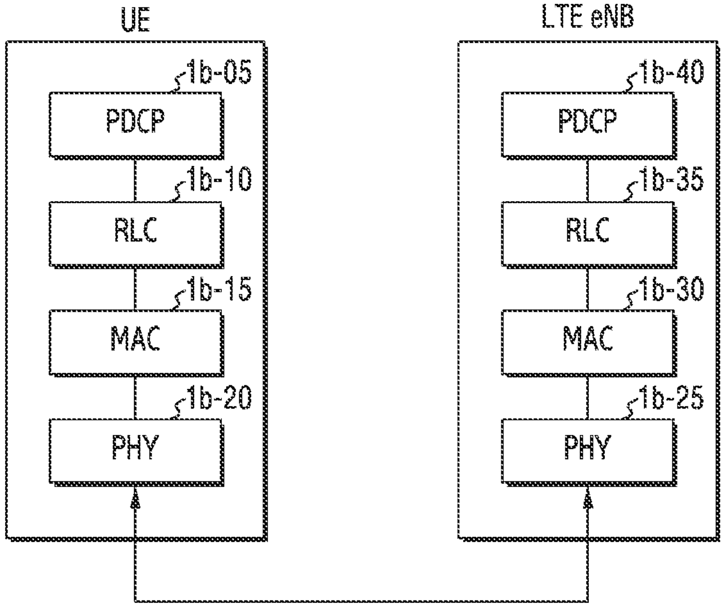
FIG. 1B is a diagram illustrating a radio protocol structure in an LTE system, according to an embodiment.

FIG. 1B is a diagram illustrating the structure of a wireless protocol of an LTE system, according to an embodiment.

Referring to FIG. 1B, the wireless protocol of the LTE system may include a packet data convergence protocol (PDCP) 1*b*-05 and 1*b*-40, a radio link control (RLC) 1*b*-10 and 1*b*-35, and a MAC 1*b*-15 and 1*b*-30, in a terminal and eNB, respectively. The PDCPs 1*b*-05 and 1*b*-40 may be responsible for IP header compression/restoration. The main functions of the PDCP may be summarized as follows:

- Header compression and decompression: ROHC only
- Transfer of user data
- In-sequence delivery of upper-layer packet data units (PDUs) at PDCP re-establishment procedure for RLC AM
- For split bearers in direct current (DC) (only support for RLC acknowledge mode (AM)): PDCP PDU routing for transmission and PDCP PDU reordering for reception
- Duplicate detection of lower-layer service data units (SDUs) at PDCP re-establishment procedure for RLC AM
- Retransmission of PDCP SDUs at handover and, for split bearers in DC, of PDCP PDUs at PDCP data recovery procedure, for RLC AM
- Ciphering and deciphering
- Timer-based SDU discard in uplink The RLC 1*b*-10 and 1*b*-35 may reconfigure the PDCP PDU to an appropriate size to perform an automatic repeat request (ARQ) operation. The main functions of the RLC may be summarized as follows:

- Transfer of upper-layer PDUs
- Error Correction through ARQ (only for AM data transfer)
- Concatenation, segmentation and reassembly of RLC SDUs (only for unacknowledged mode (UM) and AM data transfer)

Re-segmentation of RLC data PDUs (only for AM data transfer)
Reordering of RLC data PDUs (only for UM and AM data transfer
Duplicate detection (only for UM and AM data transfer)
Protocol error detection (only for AM data transfer)
RLC SDU discard (only for UM and AM data transfer)
RLC re-establishment The MACs 1*b*-15 and 1*b*-30 may be connected to various RLC-layer devices configured in a terminal, and perform operations of multiplexing RLC PDUs to MAC PDUs and demultiplexing RLC PDUs from MAC PDUs. The main functions of MAC may be summarized as follows:

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through hybrid ARQ (HARD)
Priority handling between logical channels of one UE
Priority handling between UEs by means of dynamic scheduling
Multimedia broadcast multicast service (MBMS) service identification function
Transport format selection function
Padding function The physical layers 1*b*-20 and 1*b*-25 may channel-code and modulate the upper-layer data, convert the same into an OFDM symbol, and transmit the same to a radio channel, or may demodulate and channel decode an OFDM symbol received through the radio channel and transmit the same to the upper layer.

Figure 1C:
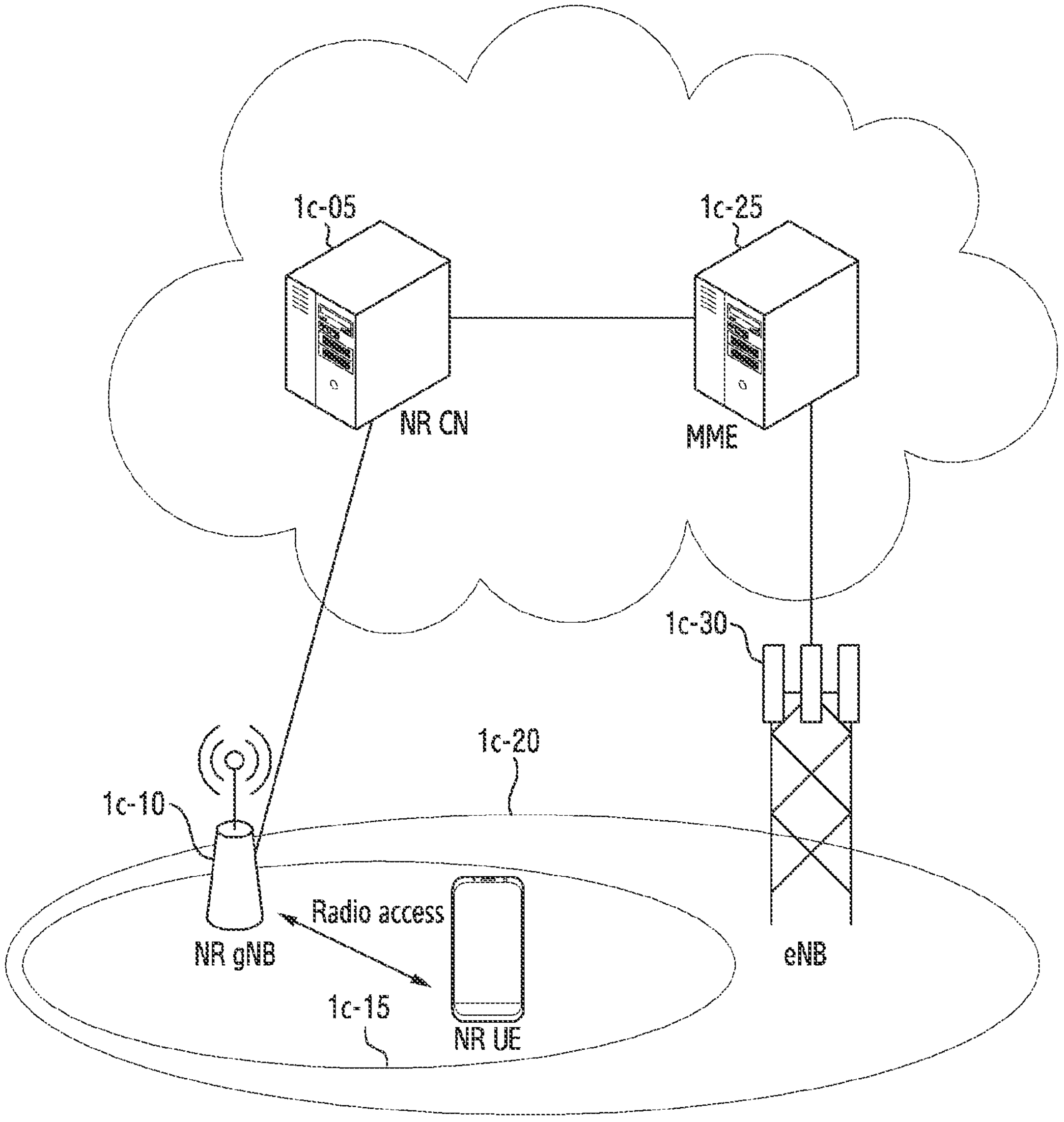
FIG. 1C is a diagram illustrating a structure of a mobile communication system, according to an embodiment.

FIG. 1C is a diagram illustrating the structure of a mobile communication system, according to an embodiment.

Referring to FIG. 1C, as illustrated, the radio access network of the mobile communication (or wireless communication) system (hereinafter, referred to as NR or 5G) may include a next-generation base station (new-radio Node B, hereinafter, NR gNB or NR base station) 1*c*-10 and new-radio core network (NR CN) 1*c*-05. The user terminal (new-radio user equipment, NR UE, or terminal) 1*c*-15 may access the external network through the NR gNB 1*c*-10 and the NR CN 1*c*-05.

In FIG. 1C, the NR gNB 1*c*-10 may correspond to an eNB of an existing LTE system. The NR gNB 1*c*-10 is connected to the NR UE 1*c*-15 through a wireless channel and may provide superior service than the existing Node B. In the mobile communication system, since all user traffic is served through a shared channel, a device is required to collect and schedule status information such as buffer status of UEs, available transmission power status, and channel status, and the NR NB 1*c*-10 may be responsible therefor. One NR gNB may usually control multiple cells. In order to implement ultra-high-speed data transmission compared to the current LTE, more than the existing maximum bandwidth may be provided, and OFDM radio access technology may be additionally combined with beamforming technology. In addition, an adaptive modulation and coding (AMC) method may be applied to determine the modulation scheme and the channel-coding rate according to the state of a channel used by a terminal. The NR CN 1*c*-05 may perform functions such as mobility support, bearer setup, and quality of service (QoS) configuration. The NR core network (CN) is a device that is responsible for various control functions as well as mobility management functions for a terminal, and may be connected to multiple base stations. In addition, the mobile communication system may be linked with the existing LTE system, and the NR CN may be connected to the MME 1*c*-25 through a network interface. The MME may be connected to the existing base station eNB 1*c*-30.

Figure 1D:
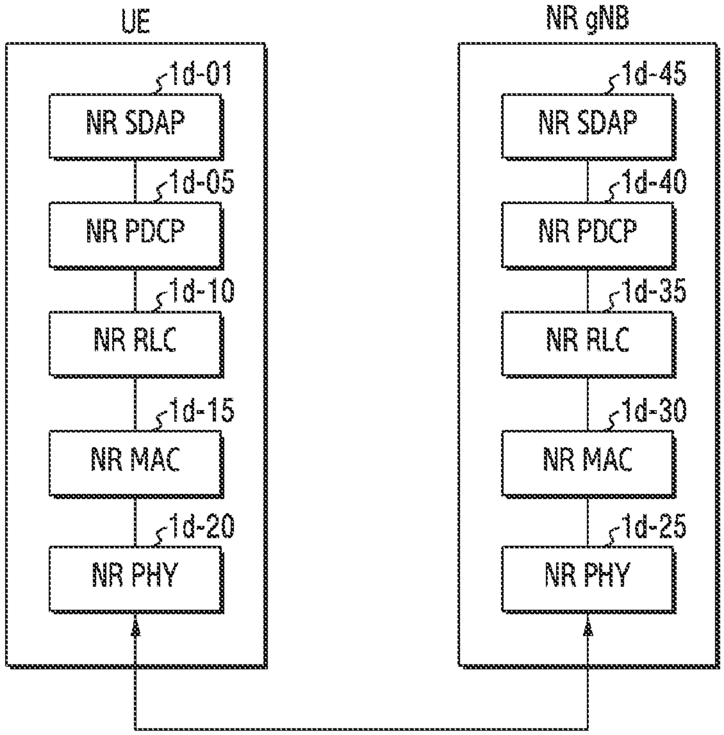
FIG. 1D is a diagram illustrating a wireless protocol structure in a mobile communication system, according to an embodiment.

FIG. 1D is a diagram illustrating the structure of a wireless protocol of a mobile communication system, according to an embodiment.

Referring to FIG. 1D, the wireless protocol structure of a mobile communication system may include NR service data adaptation protocols (SDAPs) 1*d*-01 and 1*d*-45, NR PDCPs 1*d*-05 and 1*d*-40, NR RLCs 1*d*-10 and 1*d*-35, and NR MACs 1*d*-15 and 1*d*-30 in a terminal and an NR base station, respectively.

The main functions of the NR SDAPs 1*d*-01 and 1*d*-45 may include some of the following functions:

Transfer of user-plane data
Mapping between a QoS flow and a data radio bearer (DRB) for both DL and UL
Marking QoS flow ID in both DL and UL packets
Mapping reflective QoS flow to DRB mapping for the UL SDAP PDUs For the SDAP-layer device, the UE may be configured with regard to whether to use the header of the SDAP-layer device or the function of the SDAP-layer device for each PDCP-layer device, for each bearer, or for each logical channel through an RRC message, and when the SDAP header is configured, the non-access stratum (NAS) QoS reflection configuration 1-bit indicator (NAS reflective QoS) of the SDAP header and the AS QoS reflection configuration 1-bit indicator (AS reflective QoS) may indicate that the terminal may update or reset the QoS flow of uplink and downlink and mapping information for the data bearer. The SDAP header may include QoS flow ID information indicating QoS. The QoS information may be used as data-processing priority and scheduling information to support smooth service.

The main functions of the NR PDCPs 1*d*-05 and 1*d*-40 may include some of the following functions:

Header compression and decompression: ROHC only
Transfer user data
In-sequence delivery of upper-layer PDUs
Out-of-sequence delivery of upper-layer PDUs
PDCP PDU reordering for reception
Duplicate detection of lower-layer SDUs
Retransmission of PDCP SDUs
Ciphering and deciphering
Timer-based SDU discard in uplink In the above, a reordering function of the NR PDCP device (reordering) refers to a function of reordering PDCP PDUs received from a lower layer in order based on PDCP sequence numbers (SN), and may include transmitting data to an upper layer in a reordered order, or may include a function for immediately transmitting without consideration of the order, may include a function for reordering the order to record the lost PDCP PDUs, may include a function for sending a status report for the lost PDCP PDUs to the transmitting side, and may include a function for requesting retransmission for lost PDCP PDUs.

The main functions of the NR RLCs 1*d*-10 and 1*d*-35 may include some of the following functions:

Transfer of upper-layer PDUs
In-sequence delivery of upper-layer PDUs
Out-of-sequence delivery of upper-layer PDUs
Error Correction through ARQ
Concatenation, segmentation and reassembly of RLC SDUs
Re-segmentation of RLC data PDUs Reordering of RLC data PDUs Duplicate detection Protocol error detection RLC SDU discard RLC re-establishment In the above, the in-sequence delivery of the NR RLC device refers to a function of sequentially transmitting RLC SDUs received from a lower layer to an upper layer. Originally, when one RLC SDU is received by being divided into several RLC SDUs, it may include a function of reassembling and transmitting the same, may include a function of rearranging the received RLC PDUs based on an RLC sequence number (SN) or a sequence number (PDCP SN), may include a function of rearranging the order to record the lost RLC PDUs, may include a function for transmitting a status report for the lost RLC PDUs to the transmitting side, and may include a function for requesting retransmission for the lost RLC PDUs. If there is a lost RLC SDU, it may include a function of transmitting only the RLC SDUs up to the lost RLC SDU to the upper layer in sequence. Alternatively, even if there is a lost RLC SDU, if a predetermined timer has expired, a function of delivering all RLC SDUs received before the timer starts, in sequence, to an upper layer may be included. Alternatively, even if there is a lost RLC SDU, if a predetermined timer expires, a function of delivering all RLC SDUs received so far to the upper layer in sequence may be included. In addition, the RLC PDUs may be processed in the order in which they are received (regardless of the sequence number, in the order of arrival) and delivered to the PDCP device in any order (out-of-sequence delivery). In the case of segments, segments that are stored in a buffer or that are to be received at a later time may be received, reconstructed into a complete RLC PDU, processed, and then delivered to a PDCP device. The NR RLC layer may not include a concatenation function, and the function may be performed in the NR MAC layer, or may be replaced by a multiplexing function of the NR MAC layer.

The out-of-sequence delivery of the NR RLC device refers to a function of directly transmitting RLC SDUs received from a lower layer to an upper layer regardless of order. Originally, when one RLC SDU is divided into multiple RLC SDUs and received, it may include a function of reassembling and transmitting the same, and may include a function of storing the RLC SN or PDCP SN of the received RLC PDUs and arranging the order to record the lost RLC PDUs.

The NR MACs 1*d*-15 and 1*d*-30 may be connected to various NR RLC-layer devices configured in a terminal, and the main function of the NR MAC may include some of the following functions:

Mapping Between Logical Channels and Transport Channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding function

The NR PHY layers 1*d*-20 and 1*d*-25 may perform an operation of channel-coding and modulating upper-layer data, making an OFDM symbol and transmitting the same on a radio channel, or demodulating and channel-decoding an OFDM symbol received via the radio channel and transmitting the same to an upper layer.

Figure 1E:
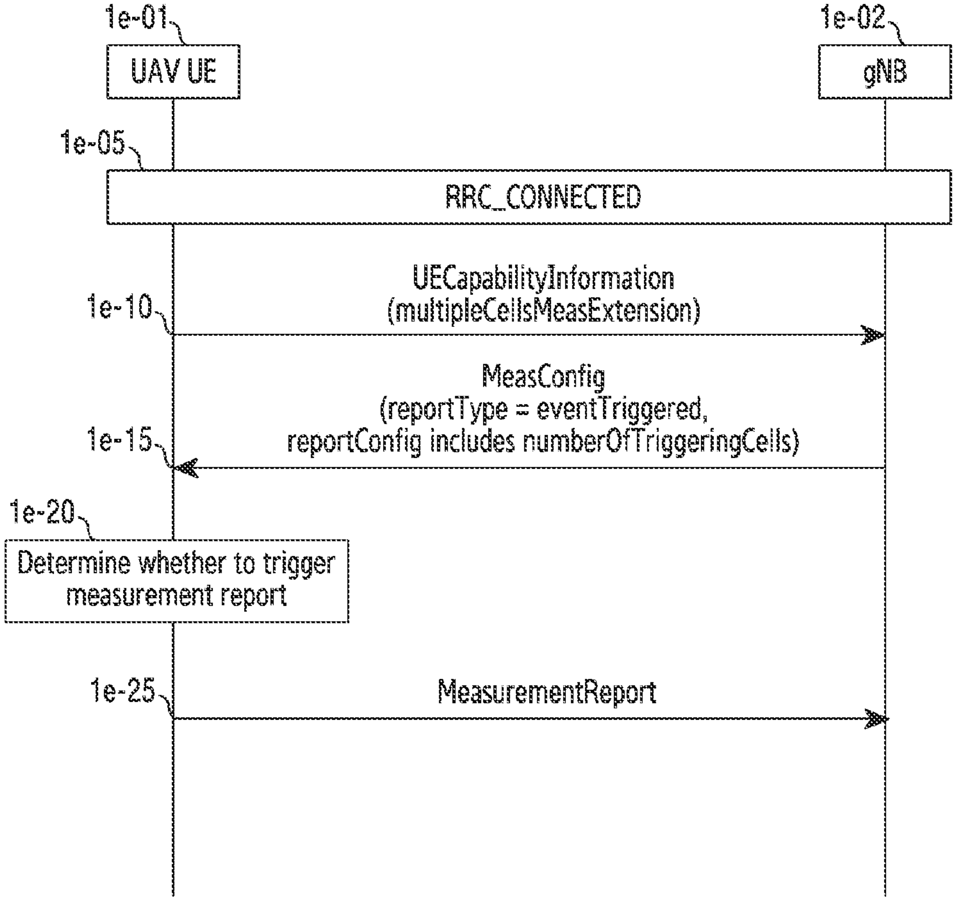
FIG. 1E is a flowchart illustrating a process of transmitting a measurement report by an uncrewed aerial vehicle (UAV) terminal to a base station in a mobile communication system, according to an embodiment.

FIG. 1E is a flow diagram illustrating a process in which a UAV UE transmits a measurement report to a base station in a mobile communication system, according to embodiments.

The UAV UE may have a feature enabling a probability of a higher line of sight than that of a terrestrial UE. Therefore, compared to a terrestrial terminal, the UAV UE may have a disadvantage of receiving DL interference from more cells. That is, the UAV UE may receive a higher level of DL interference from more neighboring cells than that of a terrestrial terminal. Similarly, the UAV UE may cause UL interference to more cells than a terrestrial terminal. A method is provided for reporting a measurement report to a base station according to the feature of the UAV UE.

Referring to FIG. 1E, a UAV UE 1*e*-01 may be in an RRC connected mode (RRC_CONNECTED) by establishing an RRC connection with an NR base station 1*e*-02.

In operation 1*e*-10, the UE may transmit a UE capability information message (UECapabilityInformation) to the base station. The message may include whether a measurement reporting configuration supports numberOfTriggeringCells (multipleCellsMeasExtension). The multipleCellsMeasExtension may indicate whether the UE is capable of deciding (identifying or detecting) whether there are cells that simultaneously satisfy a specific event condition as many as the number of cells (numberOfTriggeringCells) configured by the base station, not a single cell, when determining whether a specific event condition is satisfied, and transmitting a measurement report to the base station.

In operation 1*e*-15, the base station may transmit a predetermined RRC message (e.g., RRCResume or RRCReconfiguration) including measurement configuration information (MeasConfig) to the UE. The measurement configuration information may contain (or include) reporting configuration information (reportConfigToAddModList) containing event triggering conditions. The reportConfigToAddModList may include one or more reportConfigToAddMods, each reportConfigToAddMod may be configured as follows:

This application includes a Computer Program Listing Appendix submitted as an ASCII text file via the USPTO patent electronic filing system. The Computer Program Listing Appendix is provided in the file entitled "Computer Program Listing Appendix.txt," created on Jul. 14. 2026, and having a size of 23,976 bytes. The Computer Program Listing Appendix is incorporated by reference herein in its entirety.

Herein, reportType may be configured as eventTriggered, and numberOfTriggeringCells may be included in predetermined event configuration information (e.g., EventA3, EventA4, EventA5, EventB1, and EventB2). The numberOfTriggeringCells may indicate the number of sensed (decided, identified, or detected) cells that are required to fulfill a predetermined event for a measurement report to be triggered.

The event condition may be as follows:

5.5.4.4 Event A3 (Neighbour Becomes Offset Better than SpCell)

The UE shall:

1> consider the entering condition for this event to be satisfied when condition A3-1, as specified below, is fulfilled;

1> consider the leaving condition for this event to be satisfied when condition A3-2, as specified below, is fulfilled;

1> use the SpCell for Mp, Ofp and Ocp.

NOTE 1: The cell(s) that triggers the event has reference signals indicated in the measObjectNR associated to this event which may be different from the NR SpCell measObjectNR.

$$Mn+Ofn+Ocn-Hys>Mp+Ofp+Ocp+Off \quad \text{Inequality A3-1 (Entering condition)}$$

$$Mn+Ofn+Ocn+Hys<Mp+Ofp+Ocp+Off \quad \text{Inequality A3-2 (Leaving condition)}$$

The variables in the formula are defined as follows:

Mn is the measurement result of the neighbouring cell, not taking into account any offsets.

Ofn is the measurement object specific offset of the reference signal of the neighbour cell (i.e., offsetMO as defined within measObjectNR corresponding to the neighbour cell).

Ocn is the cell specific offset of the neighbour cell (i.e., cellIndividualOffset as defined within measObjectNR corresponding to the frequency of the neighbour cell), and set to zero if not configured for the neighbour cell.

Mp is the measurement result of the SpCell, not taking into account any offsets.

Ofp is the measurement object specific offset of the SpCell (i.e., offsetMO as defined within measObjectNR corresponding to the SpCell).

Ocp is the cell specific offset of the SpCell (i.e., cellIndividualOffset as defined within measObjectNR corresponding to the SpCell), and is set to zero if not configured for the SpCell.

Hys is the hysteresis parameter for this event (i.e., hysteresis as defined within reportConfigNR for this event).

Off is the offset parameter for this event (i.e., a3-Offset as defined within reportConfigNR for this event).

Mn, Mp are expressed in dBm in case of RSRP, or in dB in case of RSRQ and RS-SINR.

Ofn, Ocn, Ofp, Ocp, Hys, Off are expressed in dB.

NOTE 2: The definition of Event A3 also applies to CondEvent A3.

5.5.4.5 Event A4 (Neighbour Becomes Better than Threshold)

The UE shall:

1> consider the entering condition for this event to be satisfied when condition A4-1, as specified below, is fulfilled;

1> consider the leaving condition for this event to be satisfied when condition A4-2, as specified below, is fulfilled.

$$Mn+Ofn+Ocn-Hys>Thresh \quad \text{Inequality A4-1 (Entering condition)}$$

$$Mn+Ofn+Ocn+Hys<Thresh \quad \text{Inequality A4-2 (Leaving condition)}$$

The variables in the formula are defined as follows:

Mn is the measurement result of the neighbouring cell, not taking into account any offsets.

Ofn is the measurement object specific offset of the neighbour cell (i.e., offsetMO as defined within measObjectNR corresponding to the neighbour cell).

Ocn is the measurement object specific offset of the neighbour cell (i.e., cellIndividualOffset as defined within measObjectNR corresponding to the neighbour cell), and set to zero if not configured for the neighbour cell.

Hys is the hysteresis parameter for this event (i.e., hysteresis as defined within reportConfigNR for this event).

Thresh is the threshold parameter for this event (i.e., a4-Threshold as defined within reportConfigNR for this event).

Mn is expressed in dBm in case of RSRP, or in dB in case of RSRQ and RS-SINR.

Ofn, Ocn, Hys are expressed in dB.

Thresh is expressed in the same unit as Mn.

NOTE: The definition of Event A4 also applies to CondEvent A4.

5.5.4.6 Event A5 (SpCell Becomes Worse than Threshold1 and Neighbour Becomes Better than Threshold2)

The UE shall:

1> consider the entering condition for this event to be satisfied when both condition A5-1 and condition A5-2, as specified below, are fulfilled;

1> consider the leaving condition for this event to be satisfied when condition A5-3 or condition A5-4, i.e., at least one of the two, as specified below, is fulfilled;

1> use the SpCell for Mp.

NOTE 1: The parameters of the reference signal(s) of the cell(s) that triggers the event are indicated in the measObjectNR associated to the event which may be different from the measObjectNR of the NR SpCell.

$$Mp+Hys<Thresh1 \quad \text{Inequality A5-1 (Entering condition 1)}$$

$$Mn+Ofn+Ocn-Hys>Thresh2 \quad \text{Inequality A5-2 (Entering condition 2)}$$

$$Mp-Hys>Thresh1 \quad \text{Inequality A5-3 (Leaving condition 1)}$$

$$Mn+Ofn+Ocn+Hys<Thresh2 \quad \text{Inequality A5-4 (Leaving condition 2)}$$

The variables in the formula are defined as follows:

Mp is the measurement result of the NR SpCell, not taking into account any offsets.

Mn is the measurement result of the neighbouring cell, not taking into account any offsets.

Ofn is the measurement object specific offset of the neighbour cell (i.e., offsetMO as defined within measObjectNR corresponding to the neighbour cell).

Ocn is the cell specific offset of the neighbour cell (i.e., cellIndividualOffset as defined within measObjectNR corresponding to the neighbour cell), and set to zero if not configured for the neighbour cell.

Hys is the hysteresis parameter for this event (i.e., hysteresis as defined within reportConfigNR for this event).

Thresh1 is the threshold parameter for this event (i.e., a5-Threshold1 as defined within reportConfigNR for this event).

Thresh2 is the threshold parameter for this event (i.e., a5-Threshold2 as defined within reportConfigNR for this event).

Mn, Mp are expressed in dBm in case of RSRP, or in dB in case of RSRQ and RS-SINR.

Ofn, Ocn, Hys are expressed in dB.

Thresh1 is expressed in the same unit as Mp.

Thresh2 is expressed in the same unit as Mn.

NOTE 2: The definition of Event A5 also applies to CondEvent A5.

5.5.4.8 Event B1 (Inter RAT Neighbour Becomes Better than Threshold)

The UE shall:

1> consider the entering condition for this event to be satisfied when condition B1-1, as specified below, is fulfilled;

1> consider the leaving condition for this event to be satisfied when condition B1-2, as specified below, is fulfilled.

Mn+Ofn+Ocn−Hys>Thresh Inequality B1-1 (Entering condition)

Mn+Ofn+Ocn+Hys<Thresh Inequality B1-2 (Leaving condition)

The variables in the formula are defined as follows:

Mn is the measurement result of the inter-RAT neighbour cell, not taking into account any offsets.

Ofn is the measurement object specific offset of the frequency of the inter-RAT neighbour cell (i.e., eutra-Q-OffsetRange as defined within the measObject-EUTRA corresponding to the frequency of the neighbour inter-RAT cell, utra-FDD-Q-OffsetRange as defined within the measObjectUTRA-FDD corresponding to the frequency of the neighbour inter-RAT cell).

Ocn is the cell specific offset of the inter-RAT neighbour cell (i.e., cellIndividualOffset as defined within the measObjectEUTRA corresponding to the neighbour inter-RAT cell), and set to zero if not configured for the neighbour cell.

Hys is the hysteresis parameter for this event (i.e., hysteresis as defined within reportConfigInterRAT for this event).

Thresh is the threshold parameter for this event (i.e., b1-ThresholdEUTRA as defined within reportConfigInterRAT for this event, b1-ThresholdUTRA-FDD as defined for UTRA-FDD within reportConfigInterRAT for this event).

Mn is expressed in dBm or in dB, depending on the measurement quantity of the inter-RAT neighbour cell.

Ofn, Ocn, Hys are expressed in dB.

Thresh is expressed in the same unit as Mn.

5.5.4.9 Event B2 (PCell Becomes Worse than Threshold1 and Inter RAT Neighbour Becomes Better than Threshold2)

The UE shall:

1> consider the entering condition for this event to be satisfied when both condition B2-1 and condition B2-2, as specified below, are fulfilled;

1> consider the leaving condition for this event to be satisfied when condition B2-3 or condition B2-4, i.e., at least one of the two, as specified below, is fulfilled;

Mp+Hys<Thresh1 Inequality B2-1 (Entering condition 1)

Mn+Ofn+Ocn−Hys>Thresh2 Inequality B2-2 (Entering condition 2)

Mp−Hys>Thresh1 Inequality B2-3 (Leaving condition 1)

Mn+Ofn+Ocn+Hys<Thresh2 Inequality B2-4 (Leaving condition 2)

The variables in the formula are defined as follows:

Mp is the measurement result of the PCell, not taking into account any offsets.

Mn is the measurement result of the inter-RAT neighbour cell, not taking into account any offsets.

Ofn is the measurement object specific offset of the frequency of the inter-RAT neighbour cell (i.e., eutra-Q-OffsetRange as defined within the measObject-EUTRA corresponding to the frequency of the inter-RAT neighbour cell, utra-FDD-Q-OffsetRange as defined within the measObjectUTRA-FDD corresponding to the frequency of the neighbour inter-RAT cell).

Ocn is the cell specific offset of the inter-RAT neighbour cell (i.e., cellIndividualOffset as defined within the measObjectEUTRA corresponding to the neighbour inter-RAT cell), and set to zero if not configured for the neighbour cell.

Hys is the hysteresis parameter for this event (i.e., hysteresis as defined within reportConfigInterRAT for this event).

Thresh1 is the threshold parameter for this event (i.e., b2-Threshold1 as defined within reportConfigInterRAT for this event).

Thresh2 is the threshold parameter for this event (i.e., b2-Threshold2EUTRA as defined within reportConfigInterRAT for this event, b2-Threshold2UTRA-FDD as defined for UTRA-FDD within reportConfigInterRAT for this event).

Mp is expressed in dBm in case of RSRP, or in dB in case of RSRQ and SINR.

Mn is expressed in dBm or dB, depending on the measurement quantity of the inter-RAT neighbour cell.

Ofn, Ocn, Hys are expressed in dB.

Thresh1 is expressed in the same unit as Mp.

Thresh2 is expressed in the same unit as Mn.

In operation 1*e*-20, the UE may decide (identify or check) whether a measurement report should be triggered, based on the measurement configuration information received in operation 1*e*-15. Specifically, the UE may decide (identify or check) that the measurement report is triggered when at least one of the following conditions is satisfied:

2> if the reportType is set to eventTriggered and if the corresponding reportConfig includes numberOfTriggeringCells, and if the entry condition applicable for this event, i.e., the event corresponding with the eventId of the corresponding reportConfig within VarMeasConfig, is fulfilled for one or more applicable cells for all measurements after layer 3 filtering taken during timeToTrigger defined for this event within the VarMeasConfig:

3> If the VarMeasReportList does not include a measurement reporting entry for this measId (a first cell triggers the event):

4> include a measurement reporting entry within the VarMeasReportList for this measId;

3> If the number of cell(s) in the cellsTriggeredList is larger than or equal to numberOfTriggeringCells:

4> include the concerned cell(s) in the cellsTriggeredList defined within the VarMeasReportList for this measId;

3> else:

4> include the concerned cell(s) in the cellsTriggeredList defined within the VarMeasReportList for this measId;

4> If the number of cell(s) in the cellsTriggeredList is larger than or equal to numberOfTriggeringCells:

5> set the numberOfReportsSent defined within the VarMeasReportList for this measId to 0;

5> initiate the measurement reporting procedure, as specified in 5.5.5;

2> if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:

3> remove the concerned cell(s) in the cellsTriggeredList defined within the VarMeasReportList for this measId;

3> if reportOnLeave is set to TRUE for the corresponding reporting configuration or if a6-ReportOnLeave is set to TRUE or if a4-a5-ReportOnLeave is set to TRUE for the corresponding reporting configuration:

4> initiate the measurement reporting procedure, as specified in 5.5.5;

3> if the cellsTriggeredList defined within the VarMeasReportList for this measId is empty:

4> remove the measurement reporting entry within the VarMeasReportList for this measId;

4> stop the periodical reporting timer for this measId, if running;

In case that the UE decides (identifies or checks) that a measurement report is triggered in operation 1*e*-20, the UE may transmit the measurement report to the base station in operation 1*e*-25. A specific procedure for transmitting the measurement report to the base station by the UE may be as follows:

For the measId for which the measurement reporting procedure was triggered, the UE shall set the measResults within the MeasurementReport message as follows:

1> set the measId to the measurement identity that triggered the measurement reporting;

1> for each serving cell configured with servingCellMO:

2> if the reportConfig associated with the measId that triggered the measurement reporting includes rsType:

3> if the serving cell measurements based on the rsType included in the reportConfig that triggered the measurement report are available:

4> set the measResultServingCell within measResultServingMOList to include RSRP, RSRQ and the available SINR of the serving cell, derived based on the rsType included in the reportConfig that triggered the measurement report;

2> else:

3> if SSB based serving cell measurements are available:

4> set the measResultServingCell within measResultServingMOList to include RSRP, RSRQ and the available SINR of the serving cell, derived based on SSB;

3> else if CSI-RS based serving cell measurements are available:

4> set the measResultServingCell within measResultServingMOList to include RSRP, RSRQ and the available SINR of the serving cell, derived based on CSI-RS;

1> set the servCellId within measResultServingMOList to include each NR serving cell that is configured with servingCellMO, if any;

1> if the reportConfig associated with the measId that triggered the measurement reporting includes reportQuantityRS-Indexes and maxNrofRS-IndexesToReport:

2> for each serving cell configured with servingCellMO, include beam measurement information according to the associated reportConfig as described in 5.5.5.2;

1> if the reportConfig associated with the measId that triggered the measurement reporting includes reportAddNeighMeas:

2> for each measObjectId referenced in the measIdList which is also referenced with servingCellMO, other than the measObjectId corresponding with the measId that triggered the measurement reporting:

3> if the measObjectNR indicated by the servingCellMO includes the RS resource configuration corresponding to the rsType indicated in the reportConfig:

4> set the measResultBestNeighCell within measResultServingMOList to include the physCellId and the available measurement quantities based on the reportQuantityCell and rsType indicated in reportConfig of the non-serving cell corresponding to the concerned measObjectNR with the highest measured RSRP if RSRP measurement results are available for cells corresponding to this measObjectNR, otherwise with the highest measured RSRQ if RSRQ measurement results are available for cells corresponding to this measObjectNR, otherwise with the highest measured SINR;

4> if the reportConfig associated with the measId that triggered the measurement reporting includes reportQuantityRS-Indexes and maxNrofRS-IndexesToReport:

5> for each best non-serving cell included in the measurement report:

6> include beam measurement information according to the associated reportConfig as described in 5.5.5.2;

1> if the reportConfig associated with the measId that triggered the measurement reporting is set to eventTriggered and eventID is set to eventA3, or eventA4, or eventA5, or eventB1, or eventB2:

2> if the UE is in NE-DC and the measurement configuration that triggered this measurement report is associated with the MCG:

3> set the measResultServFreqListEUTRA-SCG to include an entry for each E-UTRA SCG serving frequency with the following:

4> include carrierFreq of the E-UTRA serving frequency;

4> set the measResultServingCell to include the available measurement quantities that the UE is configured to measure by the measurement configuration associated with the SCG;

4> if reportConfig associated with the measId that triggered the measurement reporting includes reportAddNeighMeas:

5> set the measResultServFreqListEUTRA-SCG to include within measResultBestNeighCell the quantities of the best non-serving cell, based on RSRP, on the concerned serving frequency;

1> if reportConfig associated with the measId that triggered the measurement reporting is set to eventTriggered and eventID is set to eventA3, or eventA4, or eventA5:

2> if the UE is in NR-DC and the measurement configuration that triggered this measurement report is associated with the MCG:

3> set the measResultServFreqListNR-SCG to include for each NR SCG serving cell that is configured with servingCellMO, if any, the following:

4> if the reportConfig associated with the measId that triggered the measurement reporting includes rsType:

5> if the serving cell measurements based on the rsType included in the reportConfig that triggered the measurement report are available according to the measurement configuration associated with the SCG:

6> set the measResultServingCell within measResultServFreqListNR-SCG to include RSRP, RSRQ and the available SINR of the serving cell, derived based on the rsType included in the reportConfig that triggered the measurement report;

4> else:

5> if SSB based serving cell measurements are available according to the measurement configuration associated with the SCG:

6> set the measResultServingCell within measResultServFreqListNR-SCG to include RSRP, RSRQ and the available SINR of the serving cell, derived based on SSB;

5> else if CSI-RS based serving cell measurements are available according to the measurement configuration associated with the SCG:

6> set the measResultServingCell within measResultServFreqListNR-SCG to include RSRP, RSRQ and the available SINR of the serving cell, derived based on CSI-RS;

4> if results for the serving cell derived based on SSB are included:

5> include the ssbFrequency to the value indicated by ssbFrequency as included in the MeasObjectNR of the serving cell;

4> if results for the serving cell derived based on CSI-RS are included:

5> include the refFreqCSI-RS to the value indicated by refFreqCSI-RS as included in the MeasObjectNR of the serving cell;

4> if the reportConfig associated with the measId that triggered the measurement reporting includes report QuantityRS-Indexes and maxNrofRS-IndexesToReport:

5> for each serving cell configured with servingCellMO, include beam measurement information according to the associated reportConfig as described in 5.5.5.2, where availability is considered according to the measurement configuration associated with the SCG;

4> if reportConfig associated with the measId that triggered the measurement reporting includes reportAddNeighMeas:

5> if the measObjectNR indicated by the servingCellMO includes the RS resource configuration corresponding to the rsType indicated in the reportConfig:

6> set the measResultBestNeighCellListNR within measResultServFreqListNR-SCG to include one entry with the physCellId and the available measurement quantities based on the reportQuantityCell and rsType indicated in reportConfig of the non-serving cell corresponding to the concerned measObjectNR with the highest measured RSRP if RSRP measurement results are available for cells corresponding to this measObjectNR, otherwise with the highest measured RSRQ if RSRQ measurement results are available for cells corresponding to this measObjectNR, otherwise with the highest measured SINR, where availability is considered according to the measurement configuration associated with the SCG;

7> if the reportConfig associated with the measId that triggered the measurement reporting includes reportQuantityRS-Indexes and maxNrofRS-IndexesToReport:

8> for each best non-serving cell included in the measurement report:

9> include beam measurement information according to the associated reportConfig as described in 5.5.5.2, where availability is considered according to the measurement configuration associated with the SCG;

1> if the measRSSI-ReportConfig is configured within the corresponding reportConfig for this measId:

2> set the rssi-Result to the linear average of sample value(s) provided by lower layers in the reportInterval;

2> set the channelOccupancy to the rounded percentage of sample values which are beyond the channelOccupancyThreshold within all the sample values in the reportInterval;

1> if the UE is acting as L2 U2N Remote UE:

2> set the sl-MeasResultServingRelay to include the SL-RSRP of the serving L2 U2N Relay UE;

NOTE 1: In case of no data transmission from L2 U2N Relay UE to L2 U2N Remote UE, it is left to UE implementation whether to use SL-RSRP or SD-RSRP when setting the sl-MeasResultServingRelay of the serving L2 U2N Relay UE.

1> if there is at least one applicable neighbouring cell or candidate L2 U2N Relay UE to report:

2> if the reportType is set to eventTriggered or periodical:

3> if the measurement report concerns the candidate L2 U2N Relay UE:

4> set the sl-MeasResultsCandRelay in measResultNeighCells to include the best candidate L2 U2N Relay UEs up to maxReportCells in accordance with the following:

5> if the reportType is set to eventTriggered:

6> include the L2 U2N Relay UEs included in the relaysTriggeredList as defined within the VarMeasReportList for this measId;

5> else:

6> include the applicable L2 U2N Relay UEs for which the new measurement results became available since the last periodical reporting or since the measurement was initiated or reset;

5> for each L2 U2N Relay UE that is included in the sl-MeasResultsCandRelay:

6> include the sl-RelayUE-Identity;

5> for each included L2 U2N Relay UE, include the layer 3 filtered measured results in accordance with the reportConfig for this measId, ordered as follows:

6> set the sl-MeasResult to include the quantity(ies) indicated in the reportQuantityRelay within the concerned reportConfigRelay in decreasing order of the sorting quantity, determined as specified in 5.5.5.3, i.e., the best L2 U2N Relay UE is included first;

3> else:

4> set the measResultNeighCells to include the best neighbouring cells up to maxReportCells in accordance with the following:

5> if the reportType is set to eventTriggered and eventId is not set to eventD1:

6> include the cells included in the cellsTriggeredList as defined within the VarMeasReportList for this measId;

5> else:

6> include the applicable cells for which the new measurement results became available since the last periodical reporting or since the measurement was initiated or reset;

5> for each cell that is included in the measResultNeighCells, include the physCellId;

5> if the reportType is set to eventTriggered or periodical:

6> for each included cell, include the layer 3 filtered measured results in accordance with the reportConfig for this measId, ordered as follows:

7> if the measObject associated with this measId concerns NR:

8> if rsType in the associated reportConfig is set to ssb:

9> set resultsSSB-Cell within the measResult to include the SS/PBCH block based quantity(ies) indicated in the reportQuantityCell within the concerned reportConfig, in decreasing order of the sorting quantity, determined as specified in 5.5.5.3, i.e., the best cell is included first;

9> if report QuantityRS-Indexes and maxNrofRS-IndexesToReport are configured, include beam measurement information as described in 5.5.5.2;

8> else if rsType in the associated reportConfig is set to csi-rs:

9> set resultsCSI-RS-Cell within the measResult to include the CSI-RS based quantity(ies) indicated in the reportQuanfityCell within the concerned reportConfig, in decreasing order of the sorting quantity, determined as specified in 5.5.5.3, i.e., the best cell is included first;

9> if reportQuantityRS-Indexes and maxNrofRS-IndexesToReport are configured, include beam measurement information as described in 5.5.5.2;

7> if the measObject associated with this measId concerns E-UTRA:

8> set the measResult to include the quantity(ies) indicated in the reportQuantity within the concerned reportConfigInterRAT in decreasing order of the sorting quantity, determined as specified in 5.5.5.3, i.e., the best cell is included first;

7> if the measObject associated with this measId concerns UTRA-FDD and if ReportConfigInterRAT includes the reportQuantityUTRA-FDD:

8> set the measResult to include the quantity(ies) indicated in the reportQuantityUTRA-FDD within the concerned reportConfigInterRAT in decreasing order of the sorting quantity, determined as specified in 5.5.5.3, i.e., the best cell is included first;

2> else:

3> if the cell indicated by cellForWhichToReportCGI is an NR cell:

4> if plmn-IdentityInfoList of the cgi-Info for the concerned cell has been obtained:

5> include the plmn-IdentityInfoList including plmn-IdentityList, trackingAreaCode (if available), trackingAreaList (if available), ranac (if available), cellIdentity and cellReservedForOperatorUse for each entry of the plmn-IdentityInfoList;

5> include frequencyBandList if available;

5> for each PLMN-IdentityInfo in plmn-IdentityInfoList:

6> if the gNB-ID-Length is broadcast:

7> include gNB-ID-Length;

4> if nr-CGI-Reporting-NPN is supported by the UE and npn-IdentityInfoList of the cgi-Info for the concerned cell has been obtained:

5> include the npn-IdentityInfoList including npn-IdentityList, trackingAreaCode, ranac (if available), cellIdentity and cellReservedForOperatorUse for each entry of the npn-IdentityInfoList;

5> for each NPN-IdentityInfo in NPN-IdentityInfoList:

6> if the gNB-ID-Length is broadcast:

7> include gNB-ID-Length;

5> include cellReservedForOtherUse if available;

4> else if MIB indicates the SIB1 is not broadcast:

5> include the noSIB1 including the ssb-SubcarrierOffset and pdcch-ConfigSIB1 obtained from MIB of the concerned cell;

3> if the cell indicated by cellForWhichToReportCGI is an E-UTRA cell:

4> if all mandatory fields of the cgi-Info-EPC for the concerned cell have been obtained:

5> include in the cgi-Info-EPC the fields broadcasted in E-UTRA SystemInformationBlockType1 associated to EPC;

4> if the UE is E-UTRA/5GC capable and all mandatory fields of the cgi-Info-5GC for the concerned cell have been obtained:

5> include in the cgi-Info-5GC the fields broadcasted in E-UTRA SystemInformationBlockType1 associated to 5GC;

4> if the mandatory present fields of the cgi-Info for the cell indicated by the cellForWhichToReportCGI in the associated measObject have been obtained:

5> include the freqBandIndicator;

5> if the cell broadcasts the multiBandInfoList, include the multiBandInfoList;

5> if the cell broadcasts the fregBandIndicatorPriority, include the freqBandIndicatorPriority;

1> if the corresponding measObject concerns NR:

2> if the reportSFTD-Meas is set to true within the corresponding reportConfigNR for this measId:

3> set the measResultSFTD-NR in accordance with the following:

4> set sfn-OffsetResult and frameBoundaryOffsetResult to the measurement results provided by lower layers;

4> if the reportRSRP is set to true;

5> set rsrp-Result to the RSRP of the NR PSCell derived based on SSB;

2> else if the reportSFTD-NeighMeas is included within the corresponding reportConfigNR for this measId:

3> for each applicable cell which measurement results are available, include an entry in the measResultCellList-SFTD-NR and set the contents as follows:

4> set physCellId to the physical cell identity of the concerned NR neighbour cell.

4> set sfn-OffsetResult and frameBoundaryOffsetResult to the measurement results provided by lower layers;

4> if the reportRSRP is set to true:

5> set rsrp-Result to the RSRP of the concerned cell derived based on SSB;

1> else if the corresponding measObject concerns E-UTRA:

2> if the reportSFTD-Meas is set to true within the corresponding reportConfigInterRAT for this measId:

3> set the measResultSFTD-EUTRA in accordance with the following:

4> set sfn-OffsetResult and frameBoundaryOffsetResult to the measurement results provided by lower layers;

4> if the reportRSRP is set to true;

5> set rsrpResult-EUTRA to the RSRP of the EUTRA PSCell;

1> if average uplink PDCP delay values are available:

2> set the ul-PDCP-DelayValueResultList to include the corresponding average uplink PDCP delay values;

1> if PDCP excess delay measurements are available:

2> set the ul-PDCP-ExcessDelayResultList to include the corresponding PDCP excess delay measurements;

1> if the includeCommonLocationInfo is configured in the corresponding reportConfig for this measId and detailed location information that has not been reported is available, set the content of commonLocationInfo of the locationInfo as follows:

2> include the locationTimestamp;

2> include the locationCoordinate, if available;

2> include the velocityEstimate, if available;

2> include the locationError, if available;

2> include the locationSource, if available;

2> if available, include the gnss-TOD-msec,

1> if the coarseLocationRequest is set to true in the corresponding reportConfig for this measId:

2> if available, include coarseLocationInfo;

1> if the includeWLAN-Meas is configured in the corresponding reportConfig for this measId, set the wlan-LocationInfo of the locationInfo in the measResults as follows:

2> if available, include the LogMeasResultWLAN, in order of decreasing RSSI for WLAN APs;

1> if the includeBT-Meas is configured in the corresponding reportConfig for this measId, set the BT-LocationInfo of the locationInfo in the measResults as follows:

2> if available, include the LogMeasResultBT, in order of decreasing RSSI for Bluetooth beacons;

1> if the includeSensor-Meas is configured in the corresponding reportConfig for this measId, set the sensor-LocationInfo of the locationInfo in the measResults as follows:

2> if available, include the sensor-MeasurementInformation;

2> if available, include the sensor-MotionInformation;

1> if there is at least one applicable transmission resource pool for NR sidelink communication (for measResultsSL):

2> set the measResultsListSL to include the CBR measurement results in accordance with the following:

3> if the reportType is set to eventTriggered:

4> include the transmission resource pools included in the poolsTriggeredList as defined within the VarMeasReportList for this measId;

3> else:

4> include the applicable transmission resource pools for which the new measurement results became available since the last periodical reporting or since the measurement was initiated or reset;

3> if the corresponding measObject concerns NR sidelink communication, then for each transmission resource pool to be reported:

4> set the sl-poolReportIdentity to the identity of this transmission resource pool;

4> set the sl-CBR-ResultsNR to the CBR measurement results on PSSCH and PSCCH of this transmission resource pool provided by lower layers, if available;

NOTE 1: Void.

1> if there is at least one applicable CLI measurement resource to report:

2> if the reportType is set to cli-EventTriggered or cli-Periodical:

3> set the measResultCLI to include the most interfering SRS resources or most interfering CLI-RSSI resources up to maxReportCLI in accordance with the following:

4> if the reportType is set to cli-EventTriggered:

5> if trigger quantity is set to srs-RSRP i.e., i1-Threshold is set to srs-RSRP:

6> include the SRS resource included in the cli-TriggeredList as defined within the VarMeasReportList for this measId;

5> if trigger quantity is set to cli-RSSI i.e., i1-Threshold is set to cli-RSSI:

6> include the CLI-RSSI resource included in the cli-TriggeredList as defined within the VarMeasReportList for this measId;

4> else:

5> if reportQuanfityCLI is set to srs-rsrp:

6> include the applicable SRS resources for which the new measurement results became available since the last periodical reporting or since the measurement was initiated or reset;

5> else:

6> include the applicable CLI-RSSI resources for which the new measurement results became available since the last periodical reporting or since the measurement was initiated or reset;

4> for each SRS resource that is included in the measResultCLI:

5> include the srs-ResourceId;

5> set srs-RSRP-Result to include the layer 3 filtered measured results in decreasing order, i.e., the most interfering SRS resource is included first;

4> for each CLI-RSSI resource that is included in the measResultCLI:

5> include the rssi-ResourceId;

5> set cli-RSSI-Result to include the layer 3 filtered measured results in decreasing order, i.e., the most interfering CLI-RSSI resource is included first;

1> if there is at least one applicable UE Rx-Tx time difference measurement to report:

2> set measResultRxTxTimeDiff to the latest measurement result;

1> increment the numberOfReportsSent as defined within the VarMeasReportList for this measId by 1;

1> stop the periodical reporting timer, if running;

1> if the numberOfReportsSent as defined within the VarMeasReportList for this measId is less than the reportAmount as defined within the corresponding reportConfig for this measId:

2> start the periodical reporting timer with the value of reportInterval as defined within the corresponding reportConfig for this measId;

1> else:

2> if the reportType is set to periodical or cli-Periodical or rxTxPeriodical:

3> remove the entry within the VarMeasReportList for this measId;

3> remove this measId from the measIdList within VarMeasConfig;

1> if the measurement reporting was configured by a sl-ConfigDedicatedNR received within the RRCConnectionReconfiguration:

2> submit the MeasurementReport message to lower layers for transmission via SRB1, embedded in E-UTRA RRC message ULInformationTransferIRAT as specified TS 36.331 [10], clause 5.6.28;

1> else if the UE is in (NG)EN-DC:

2> if SRB3 is configured and the SCG is not deactivated:

3> submit the MeasurementReport message via SRB3 to lower layers for transmission, upon which the procedure ends;

2> else:

3> submit the MeasurementReport message via E-UTRA embedded in E-UTRA RRC message ULInformationTransferMRDC as specified in TS 36.331 [10].

1> else if the UE is in NR-DC:

2> if the measurement configuration that triggered this measurement report is associated with the SCG:

3> if SRB3 is configured and the SCG is not deactivated:

4> submit the MeasurementReport message via SRB3 to lower layers for transmission, upon which the procedure ends;

3> else:

4> submit the MeasurementReport message via SRB1 embedded in NR RRC message ULInformationTransferMRDC as specified in 5.7.2a.3;

2> else:

3> submit the MeasurementReport message via SRB1 to lower layers for transmission, upon which the procedure ends;

1> else:

2> submit the MeasurementReport message to lower layers for transmission, upon which the procedure ends.

Figure 1F:
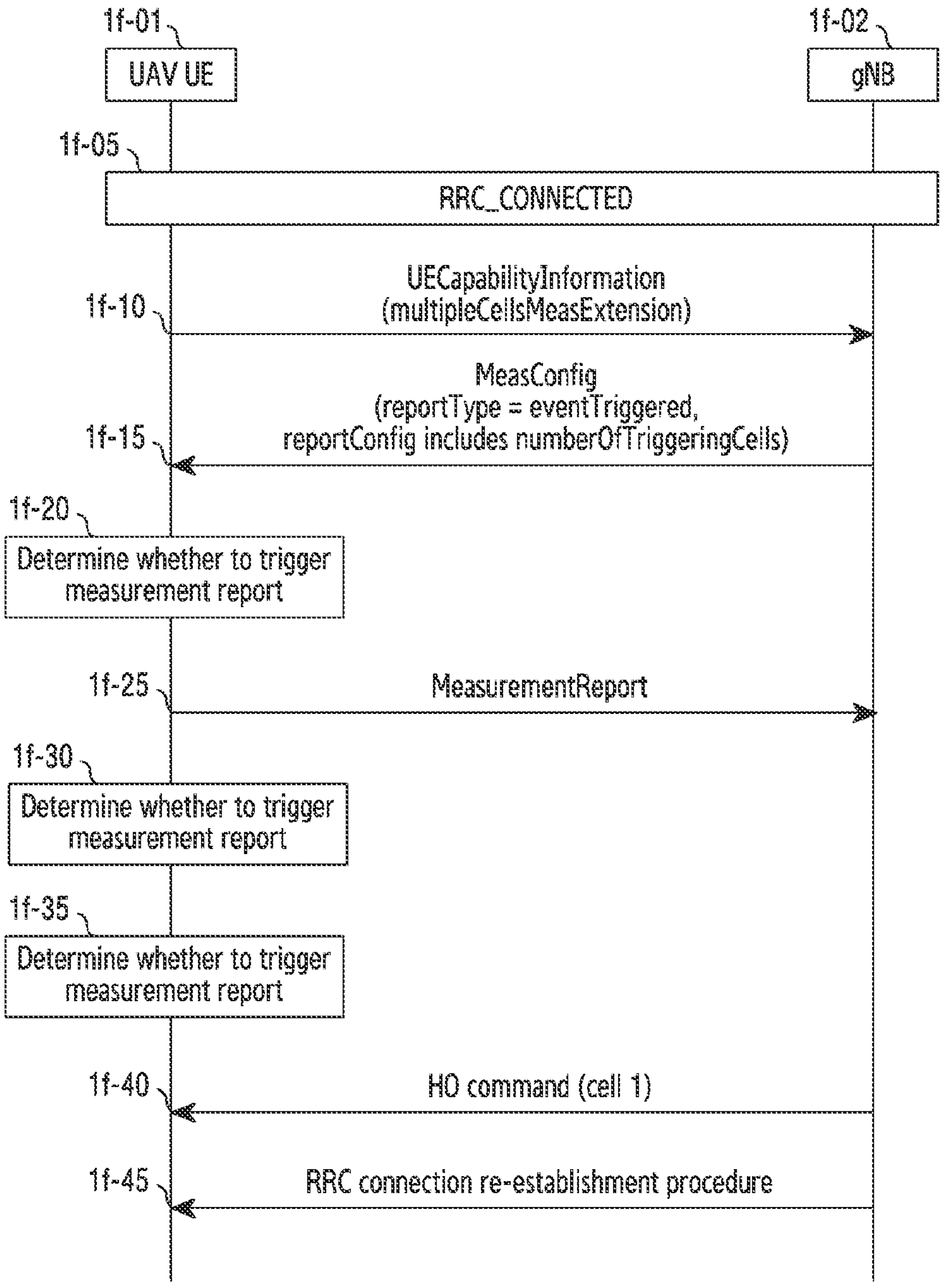
FIG. 1F is a flow diagram illustrating a process in which a handover fails when a UAV UE transmits a measurement report to a base station in a mobile communication system, according to an embodiment.

FIG. 1F is a flow diagram illustrating a process in which a handover fails when a UAV UE transmits a measurement report to a base station in a mobile communication system, according to an embodiment.

Referring to FIG. 1F, a UAV UE **1*f*-01 may be in an RRC connected mode (RRC_CONNECTED) by establishing an RRC connection with an NR base station 1*f*-02**.

In operation **1*f*-10, the UE may transmit a UE capability information message (UECapabilityInformation) to the base station. Transmission of the UE capability information message (UECapabilityInformation) may follow an above-described embodiment (e.g., FIG. 1**E).

In operation **1*f*-15, the base station may transmit a predetermined RRC message (e.g., RRCResume or RRCReconfiguration) including measurement configuration information (MeasConfig) to the UE. The predetermined RRC message (e.g., RRCResume or RRCReconfiguration) may follow an above-described embodiment (e.g., FIG. 1**E). For convenience of explanation, the base station may configure numberOfTriggeringCells to be 3, and configure eventTriggered to be EventA3.

In operation **1*f*-20, the UE may decide (identify or check) whether a measurement report should be triggered, based on the measurement configuration information received in operation 1*f*-15**. Specifically, the UE may decide (identify, or check) whether the following conditions are satisfied.

2> if the reportType is set to eventTriggered and if the corresponding reportConfig includes numberOfTriggeringCells, and if the entry condition applicable for this event, i.e., the event corresponding with the eventId of the corresponding reportConfig within VarMeasConfig, is fulfilled for one or more applicable cells for all measurements after layer 3 filtering taken during timeToTrigger defined for this event within the VarMeasConfig:

3> If the VarMeasReportList does not include a measurement reporting entry for this measId (a first cell triggers the event):

4> include a measurement reporting entry within the VarMeasReportList for this measId;

3> If the number of cell(s) in the cellsTriggeredList is larger than or equal to numberOfTriggeringCells:

4> include the concerned cell(s) in the cellsTriggeredList defined within the VarMeasReportList for this measId;

3> else:

4> include the concerned cell(s) in the cellsTriggeredList defined within the VarMeasReportList for this measId;

4> If the number of cell(s) in the cellsTriggeredList is larger than or equal to numberOfTriggeringCells:

5> set the numberOfReportsSent defined within the VarMeasReportList for this measId to 0;

5> initiate the measurement reporting procedure, as specified in 5.5.5;

The UE may include cell 1, cell 2, and/or cell 3 in the cellTriggeredCellList when cell 1, cell 2, and/or cell 3 satisfy the entry condition for EventA3. The UE may initiate a measurement reporting procedure when the number of cells included in cellTriggeredCellList is larger than or equal to numberOfTriggeringCells.

In operation **1*f*-25, the UE may transmit a measurement report to the base station according to an above-described embodiment (e.g., FIG. 1**E).

In operation **1*f*-30, the UE may decide (identify or check) whether a measurement report should be triggered, based on the measurement configuration information received in operation 1*f*-15**. That is, the UE may include cell 1, cell 2, cell 3, and/or cell 4 in the cellTriggeredCellList when cell 1, cell 2, cell 3, and/or cell 4 satisfy the entry condition for EventA3. However, the UE may not initiate a measurement reporting procedure. That is, the UE has a feature of not initiating the measurement reporting procedure when the following conditions are satisfied:

Once such condition is met and a measurement report is sent, the list of triggered cells is updated when subsequent cell(s) fulfil the event, however further measurement reports are not sent while the list of triggered cells remains larger than or equal to the configured number of cells.

In operation **1*f*-35, the UE may decide (identify or check) whether a measurement report should be triggered, based on the measurement configuration information received in operation 1*f*-15**. Specifically, the UE may include cell 2, cell 3, and cell 4 in cellTriggeredCellList because cell 2, cell 3, and cell 4 satisfy the entry condition for EventA3. As described above, the UE may not transmit the measurement report to the base station again. For example, cell 1 may be released from cellTriggeredCellList by satisfying the following leaving condition of EventA3. In this case, if reportOnLeave is not configured to be TRUE, the UE may not transmit the measurement report to the base station.

2> if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:

3> remove the concerned cell(s) in the cellsTriggeredList defined within the VarMeasReportList for this measId;

3> if reportOnLeave is set to TRUE for the corresponding reporting configuration or if a6-ReportOnLeave is set to TRUE or if a4-a5-ReportOnLeave is set to TRUE for the corresponding reporting configuration:

4> initiate the measurement reporting procedure, as specified in 5.5.5;

3> if the cellsTriggeredList defined within the VarMeasReportList for this measId is empty:

4> remove the measurement reporting entry within the VarMeasReportList for this measId;

4> stop the periodical reporting timer for this measId, if running;

In operation **1*f*-40**, the base station may transmit a predetermined RRC message (RRCReconfiguration) for instructing the UE to hand over to cell 1.

In operation **1*f*-45**, the UE may fail a handover with cell 1 and perform an RRC connection re-establishment procedure with the base station. The reason why the UE fails in handover with cell 1 may be as follows:

In operation **1*f*-25, the UE has transmitted, to the base station, a measurement report indicating that cell 1 is a cell which satisfies EventA3, but in operation 1*f*-35**, the UE did not notify the base station that cell 1 is no longer a cell which satisfies EventA3.

Figure 1G:
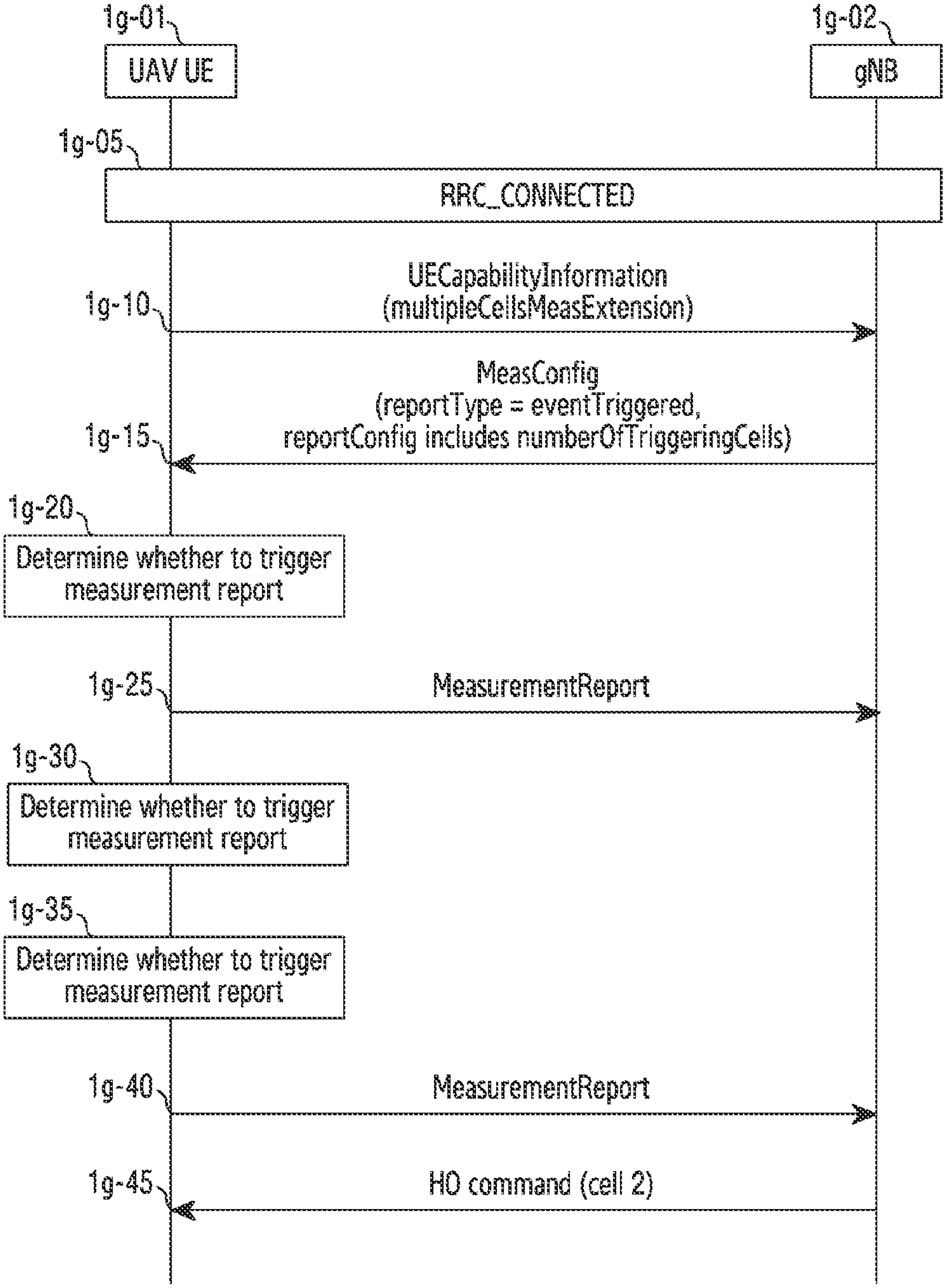
FIG. 1G is a flow diagram illustrating a process in which a UAV UE efficiently transmits a measurement report to a base station in a mobile communication system, according to an embodiment.

FIG. 1G is a flow diagram illustrating of a process in which a UAV UE efficiently transmits a measurement report to a base station in a mobile communication system, according to an embodiment.

Referring to FIG. 1G, a UAV UE **1*g*-01 may be in an RRC connected mode (RRC_CONNECTED) by establishing an RRC connection with an NR base station 1*g*-02**.

In operation **1*g*-10, the UE may transmit a UE capability information message (UECapabilityInformation) to the base station. A method of transmitting the UE capability information message (UECapabilityInformation) may follow an above-described embodiment (e.g., FIG. 1E or FIG. 1**F).

In operation **1*g*-15, the base station may transmit a predetermined RRC message (e.g., RRCResume or RRCReconfiguration) including measurement configuration information (MeasConfig) to the UE. A method of transmitting the predetermined RRC message (e.g., RRCResume or RRCReconfiguration) may follow an above-described embodiment (e.g., FIG. 1E or 1***f*). For convenience of explanation, the base station may configure numberOfTriggeringCells to be 3, and may configure eventTriggered to be EventA3 (e.g., one of EventA4, EventA5, EventB1, and EventB2, or may be configured as another event to which numberOfTriggeringCells is applied).

In operation 1*g*-20, the UE may decide whether a measurement report should be triggered, based on the measurement configuration information received in operation 1*g*-15. Specifically, the UE may decide (identify, or check) whether the following conditions are satisfied:

2> if the reportType is set to eventTriggered and if the corresponding reportConfig includes numberOfTriggeringCells, and if the entry condition applicable for this event, i.e., the event corresponding with the eventId of the corresponding reportConfig within VarMeasConfig, is fulfilled for one or more applicable cells for all measurements after layer 3 filtering taken during timeToTrigger defined for this event within the VarMeasConfig:

3> If the VarMeasReportList does not include a measurement reporting entry for this measId (a first cell triggers the event):

4> include a measurement reporting entry within the VarMeasReportList for this measId;

3> If the number of cell(s) in the cellsTriggeredList is larger than or equal to numberOfTriggeringCells:

4> include the concerned cell(s) in the cellsTriggeredList defined within the VarMeasReportList for this measId;

3> else:

4> include the concerned cell(s) in the cellsTriggeredList defined within the VarMeasReportList for this measId;

4> If the number of cell(s) in the cellsTriggeredList is larger than or equal to numberOfTriggeringCells:

5> set the numberOfReportsSent defined within the VarMeasReportList for this measId to 0;

5> initiate the measurement reporting procedure, as specified in 5.5.5;

The UE may include cell 1, cell 2, and/or cell 3 in cellTriggeredList when cell 1, cell 2, and/or cell 3 satisfy the entry condition for EventA3. When the number of cells included in cellTriggeredList is larger than or equal to numberOfTriggeringCells, the UE may initiate a measurement reporting procedure.

In operation 1*g*-25, the UE may transmit a measurement report to the base station according to an above-described embodiment (e.g., FIG. 1E or 1F).

In operation 1*g*-30, the UE may decide (identify or check) whether a measurement report should be triggered, based on the measurement configuration information received in operation 1*g*-15. That is, when cell 1, cell 2, cell 3, and/or cell 4 satisfy the entry condition for EventA3, the UE may include cell 1, cell 2, cell 3, and/or cell 4 in the cellTriggeredCellList. However, the UE may have a feature of not transmitting a measurement report to the base station. That is, the UE may not transmit the measurement report to the base station again when the following conditions are satisfied:

Once such condition is met and a measurement report is sent, the list of triggered cells is updated when subsequent cell(s) fulfil the event, however further measurement reports are not sent while the list of triggered cells remains larger than or equal to the configured number of cells.

In operation 1*g*-35, the UE may decide (identify or check) whether a measurement report should be triggered, based on the measurement configuration information received in operation 1*g*-15. Specifically, when cell 1, cell 2, cell 3, and/or cell 4 satisfy the entry condition for EventA3, the UE may include cell 1, cell 2, cell 3, and/or cell 4 in cellTriggeredCellList. Herein, when the number of cells included in cellTriggeredList is larger than or equal to numberOfTriggeringCells and at least one of the cells included in cellTriggeredList derived in operation 1*g*-25 is excluded from the current cellTriggeredList, the UE transmits a measurement report to the base station. At this time, regardless of whether reportOnLeave is configured as TRUE, the UE may transmit a measurement report to the base station.

In operation 1*g*-45, the base station may transmit a predetermined RRC message (RRCReconfiguration) for instructing the UE to perform a handover to cell 2. In addition, the UE may successfully perform a handover with cell 2, and transmit and/or receive data to and/or from cell 2.

Herein, in case that at least one of the cells, which continuously satisfy the entry condition for the event including NumberOfTriggeringCells and are included in the previous cellTriggeredList for which the UE has triggered a measurement report, is excluded from the current cellTriggeredList, the UE may transmit the measurement report to the base station. This allows the base station to resolve the issue of the UE handing over to the wrong cell.

Figure 1H:
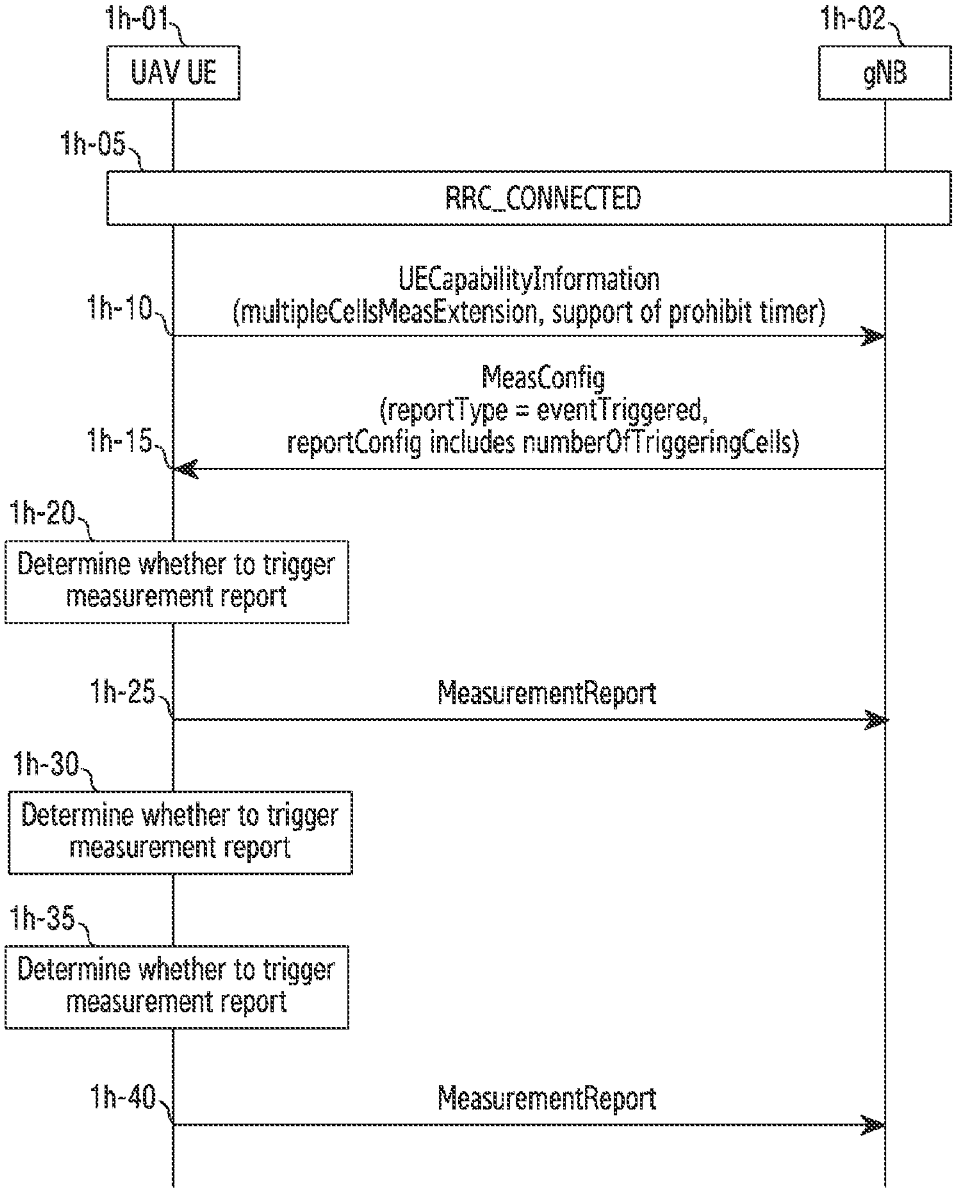
FIG. 1H is a flow diagram illustrating a process in which a UAV UE efficiently transmits a measurement report to a base station in a mobile communication system, according to an embodiment.

FIG. 1H is a flow diagram illustrating a process in which a UAV UE efficiently transmits a measurement report to a base station in a mobile communication system, according to an embodiment.

Referring to FIG. 1H, a UAV UE 1*h*-01 may be in an RRC connected mode (RRC_CONNECTED) by establishing an RRC connection with an NR base station 1*h*-02.

In operation 1*h*-10, the UE may transmit a UE capability information message (UECapabilityInformation) to the base station. A method of transmitting the UE capability information message (UECapabilityInformation) may follow an above-described embodiment (e.g., any one of FIGS. 1E to 1G). Additionally, the following parameter may be included in the message.

Whether a prohibit timer is supported or not: indicates that the UE is capable of performing a measurement report initiation procedure only in case that the prohibit timer is not running when the following 4> condition is satisfied. Alternatively, whether a prohibit timer is supported or not indicates that the UE is capable of performing a measurement report initiation procedure only in case that the cell list included in the current cellTriggeredList is different from the cells included in the cellTriggeredList for which a measurement report is most recently triggered (e.g., for the same event) and the prohibit timer is not running, even if the condition 4> below is satisfied. However, under specific conditions (e.g., when a specific event condition is satisfied or when the number of cells simultaneously satisfying a specific event condition is larger than or equal to a predetermined threshold value), the UE may transmit a measurement report even if the prohibit timer is running (e.g., under specific conditions, the transmission of a measurement report may be triggered regardless of whether the prohibit timer is running. Alternatively, under specific conditions, the UE may consider (identify, or determine) that the prohibition timer is not running. When the UE supports a prohibit timer, the UE may operate according to one of operations described in the following stages. However, the operation of the UE is not limited to the above-described operation methods, and may further include an additional operation considering the prohibit timer.

2> if the reportType is set to eventTriggered and if the corresponding reportConfig includes numberOfTriggeringCells, and if the entry condition applicable for this event, i.e., the event corresponding with the eventId of the corresponding reportConfig within VarMeasConfig, is fulfilled for one or more applicable cells for all measurements after layer 3 filtering taken during timeToTrigger defined for this event within the VarMeasConfig:

3> If the VarMeasReportList does not include a measurement reporting entry for this measId (a first cell triggers the event):

4> include a measurement reporting entry within the VarMeasReportList for this measId;

3> If the number of cell(s) in the cellsTriggeredList is larger than or equal to numberOfTriggeringCells:

4> include the concerned cell(s) in the cellsTriggeredList defined within the VarMeasReportList for this measId;

3> else:

4> include the concerned cell(s) in the cellsTriggeredList defined within the VarMeasReportList for this measId;

4> If the number of cell(s) in the cellsTriggeredList is larger than or equal to numberOfTriggeringCells:

5> set the numberOfReportsSent defined within the VarMeasReportList for this measId to 0;

5> initiate the measurement reporting procedure, as specified in 5.5.5;

In operation 1*h*-15, the base station may transmit a predetermined RRC message (e.g., RRCResume or RRCReconfiguration) including measurement configuration information (MeasConfig) to the UE. A method of transmitting the predetermined RRC message (e.g., RRCResume or RRCReconfiguration) may follow an above-described embodiment (e.g., any one of FIGS. 1E to 1G). For convenience of explanation, the base station may configure numberOfTriggeringCells to be 3, and may configure eventTriggered to be EventA3 (e.g., one of EventA4, EventA5, EventB1, and EventB2, or may be configured as another event to which numberOfTriggeringCells is applied). Herein, a value of the prohibit timer described in operation 1*h*-10 may be included in the measurement configuration information. The prohibit timer value may be configured to be a value less than or equal to reportInterval. Alternatively, the prohibit timer value may be configured to be a value scaled to reportInterval or configured to be a value of x to be scaled (e.g., 0.2). In case that a value to be scaled is configured, the UE may configure the prohibit timer value to be x *reportInterval. In case that the prohibit timer value is not configured, the UE may operate as in an above-described embodiment (e.g., any one of FIGS. 1E to 1G), or may decide (identify or check) that the prohibit timer value is configured as a default value. Alternatively, transmission of the measurement report may be triggered under a specific condition (e.g., when a specific event condition is satisfied or when the number of cells simultaneously satisfying a specific event condition is larger than or equal to a predetermined threshold value) regardless of whether the prohibit timer is running. Alternatively, under a specific condition, the UE may consider (identify or determine) that the prohibit timer is not running.

In operation 1*h*-20, the UE may decide (identify or check) whether a measurement report should be triggered, based on the measurement configuration information received in operation 1*h*-15. Specifically, the UE may decide (identify, or check) whether the following conditions are satisfied:

2> if the reportType is set to eventTriggered and if the corresponding reportConfig includes numberOfTriggeringCells, and if the entry condition applicable for this event, i.e., the event corresponding with the eventId of the corresponding reportConfig within VarMeasConfig, is fulfilled for one or more applicable cells for all measurements after layer 3 filtering taken during timeToTrigger defined for this event within the VarMeasConfig:

3> If the VarMeasReportList does not include a measurement reporting entry for this measId (a first cell triggers the event):

4> include a measurement reporting entry within the VarMeasReportList for this measId;

3> If the number of cell(s) in the cellsTriggeredList is larger than or equal to numberOfTriggeringCells:

4> include the concerned cell(s) in the cellsTriggeredList defined within the VarMeasReportList for this measId;

3> else:

4> include the concerned cell(s) in the cellsTriggeredList defined within the VarMeasReportList for this measId;

4> If the number of cell(s) in the cellsTriggeredList is larger than or equal to numberOfTriggeringCells:

5> set the numberOfReportsSent defined within the VarMeasReportList for this measId to 0;

5> initiate the measurement reporting procedure, as specified in 5.5.5;

The UE may include cell 1, cell 2, and/or cell 3 in cellTriggeredCellList when cell 1, cell 2, and/or cell 3 satisfy the entry condition for EventA3. When the number of cells included in cellTriggeredCellList is larger than or equal to numberOfTriggeringCells, the UE may initiate a measurement reporting procedure according to an above-described embodiment (e.g., any one of FIGS. 1E to 1G). At this time, the prohibit timer may be run in operation 1*h*-10.

In operation 1*h*-25, the UE may transmit a measurement report to the base station. A measurement report transmission method may follow an above-described embodiment (e.g., any one of FIGS. 1E to 1G).

In operation 1*h*-30, the UE may decide (identify or check) whether a measurement report should be triggered, based on the measurement configuration information received in operation 1*h*-15. That is, when cell 1, cell 2, cell 3, and/or cell 4 satisfy the entry condition for EventA3, the UE may include cell 1, cell 2, cell 3, and/or cell 4 in the cellTriggeredCellList. Herein, when the prohibit timer is running, the UE may not transmit the measurement report to the base station. However, under a specific condition (e.g., when a specific event condition is satisfied or when the number of cells simultaneously satisfying a specific event condition is larger than or equal to a predetermined threshold value), the UE may transmit the measurement report even if the prohibit timer is running. For example, under specific conditions, transmission of a measurement report may be triggered regardless of whether a prohibit timer is running. Alternatively, under a specific condition, the UE may consider (identify or determine) that the prohibit timer is not running and transmit a measurement report to the base station.

In operation 1*h*-35, the UE may decide (identify or check) whether a measurement report should be triggered, based on the measurement configuration information received in operation 1*h*-15. That is, the UE may include cell 1, cell 2, cell 3, and/or cell 4 in the cellTriggeredCellList when cell 1, cell 2, cell 3, and/or cell 4 satisfy the entry condition for EventA3. If the prohibit timer is not running, a measurement report start procedure may be performed. That is, in case that, while the prohibit timer is not running, the cell list included in the cellTriggeredList, for which the measurement report initiation procedure is previously triggered, is different from the cell list included in the current cellTriggeredList, and the entry condition for EventA3 is satisfied, the UE may trigger the measurement report initiation procedure. The UE may run the prohibit timer.

In operation 1*h*-40, the UE may transmit a measurement report to the base station.

Herein, when the entry condition for the event including numberOfTriggeringCells are satisfied, the UE may initiate a measurement reporting procedure and transmit the measurement report to the base station when the following conditions are satisfied:

If the current cellsTriggeredList is different from the one triggered in the latest MR and prohibit timer is not running, UE reports MR if triggering entry condition remains fulfilled.

An embodiment of the disclosure may be applied together with an above-described embodiment (e.g., any one of FIGS. 1E to 1G).

Figure 1I:
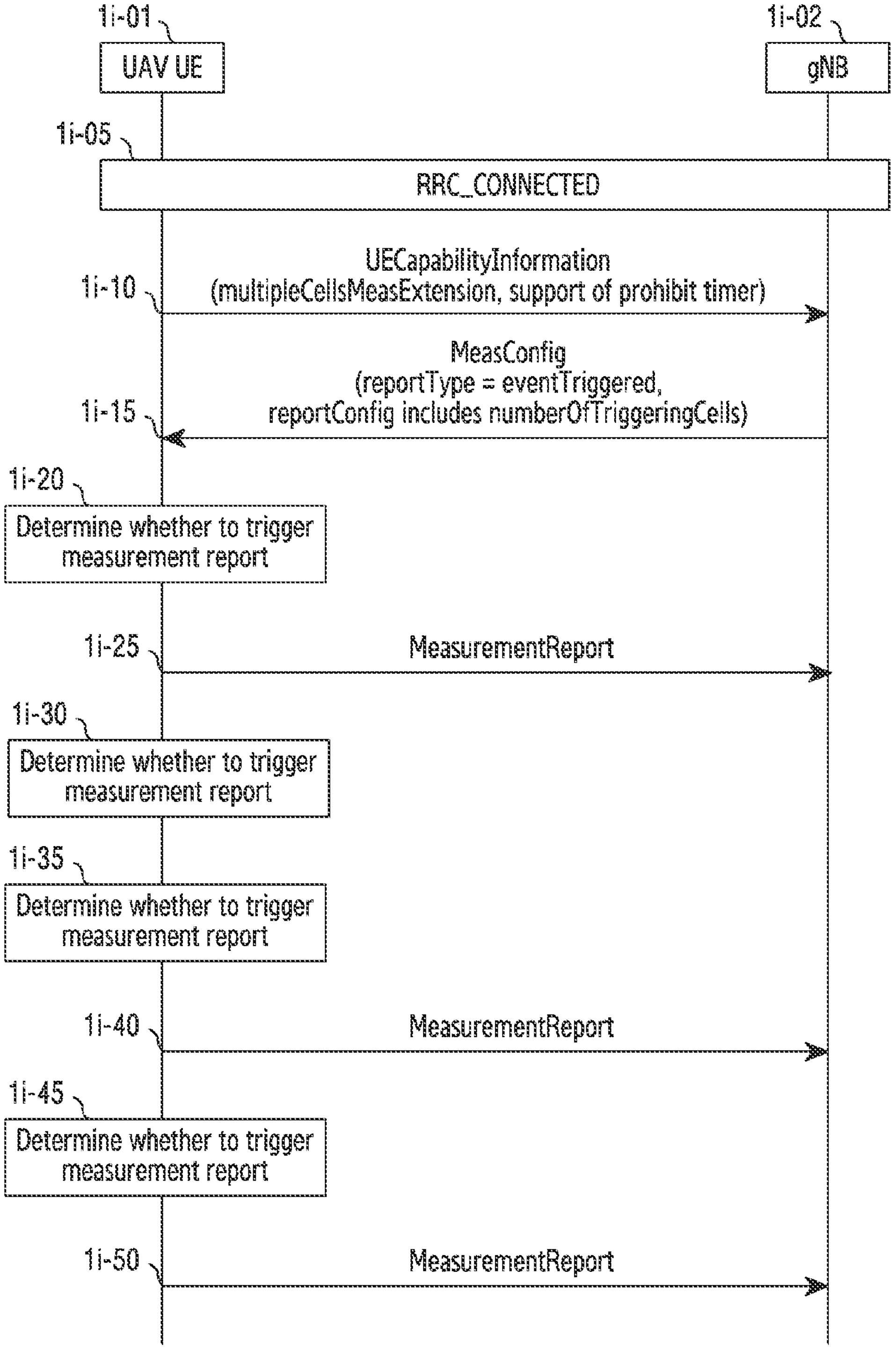
FIG. 1I is a flow diagram illustrating a process in which a UAV UE efficiently transmits a measurement report to a base station in a mobile communication system, according to an embodiment.

FIG. 1I is a flow diagram illustrating a process in which a UAV UE efficiently transmits a measurement report to a base station in a mobile communication system, according to an embodiment.

Referring to FIG. 1I, a UAV UE 1*i*-01 may be in an RRC connected mode (RRC_CONNECTED) by establishing an RRC connection with an NR base station 1*i*-02.

In operation 1*i*-10, the UE may transmit a UE capability information message (UECapabilityInformation) to the base station. A method of transmitting the UE capability information message (UECapabilityInformation) may follow an above-described embodiment (e.g., any one of FIGS. 1E to 1H). Additionally, the following parameter may be stored in the message.

Whether a prohibit timer is supported or not: indicates that the UE is capable of performing a measurement report initiation procedure only when the prohibit timer is not running when the following 4> condition is satisfied. Alternatively, whether a prohibit timer is supported or not indicates that the UE is capable of performing a measurement report initiation procedure only when the cell list included in the current cellTriggeredList is different from the cell list included in the cellTriggeredList for which a measurement report is most recently triggered (e.g., for the same event) and the prohibit timer is not running, even if the condition 4> below is satisfied. However, under a specific condition (e.g., when a specific event condition is satisfied or when the number of cells simultaneously satisfying a specific event condition is larger than or equal to a predetermined threshold value), the UE may transmit a measurement report even if the prohibit timer is running (for example, under a specific condition, transmission of the measurement report may be triggered regardless of whether the prohibit timer is running. Alternatively, under a specific condition, the UE may consider (identify or determine) that the prohibit timer is not running. In case that the UE supports the prohibit timer, the UE may operate according to any one of the operations described above in the following stages. However, the operation of the UE is not limited to the above-described operation methods, and may further include an additional operation considering the prohibit timer.

2> if the reportType is set to eventTriggered and if the corresponding reportConfig includes numberOfTriggeringCells, and if the entry condition applicable for this event, i.e., the event corresponding with the eventId of the corresponding reportConfig within VarMeasConfig, is fulfilled for one or more applicable cells for all measurements after layer 3 filtering taken during timeToTrigger defined for this event within the VarMeasConfig:

3> If the VarMeasReportList does not include a measurement reporting entry for this measId (a first cell triggers the event):

4> include a measurement reporting entry within the VarMeasReportList for this measId;

3> If the number of cell(s) in the cellsTriggeredList is larger than or equal to numberOfTriggeringCells:

4> include the concerned cell(s) in the cellsTriggeredList defined within the VarMeasReportList for this measId;

3> else:

4> include the concerned cell(s) in the cellsTriggeredList defined within the VarMeasReportList for this measId;

4> If the number of cell(s) in the cellsTriggeredList is larger than or equal to numberOfTriggeringCells:

5> set the numberOfReportsSent defined within the VarMeasReportList for this measId to 0;

5> initiate the measurement reporting procedure, as specified in 5.5.5;

In operation 1*i*-15, the base station may transmit a predetermined RRC message (e.g., RRCResume or RRCReconfiguration) including measurement configuration information (MeasConfig) to the UE. A method of transmitting the predetermined RRC message (e.g., RRCResume or RRCReconfiguration) may follow an above-described embodiment (e.g., any one of FIGS. 1E to 1H). For convenience of explanation, the base station may configure numberOfTriggeringCells to be 3, and may configure eventTriggered to be EventA3 (e.g., one of EventA4, EventA5, EventB1, and EventB2, or may be configured as another event to which numberOfTriggeringCells is applied). Herein, a value of the prohibit timer described in operation 1*i*-10 may be included in the measurement configuration information. The prohibit timer value may be configured to be a value less than or equal to reportInterval. Alternatively, the prohibit timer value may be configured to be a value scaled to reportInterval or configured to be a value of x to be scaled (e.g., 0.2). In case that a value to be scaled is configured, the UE may configure the prohibit timer value to be x *reportInterval. In case that the prohibit timer value is not configured, the UE may operate as in an above-described embodiment (e.g., any one of FIGS. 1E to 1H), or may decide (identify or check) that the prohibit timer value is configured as a default value. Alternatively, transmission of the measurement report may be triggered under a specific condition (e.g., when a specific event condition is satisfied or when the number of cells simultaneously satisfying a specific event condition is larger than or equal to a predetermined threshold value) regardless of whether the prohibit timer is running. Alternatively, under a specific condition, the UE may consider (identify or determine) that the prohibit timer is not running.

In operation 1*i*-20, the UE may decide (identify or check) whether a measurement report should be triggered, based on the measurement configuration information received in operation 1*h*-15. Specifically, the UE may decide (identify, or check) whether the following conditions are satisfied:

2> if the reportType is set to eventTriggered and if the corresponding reportConfig includes numberOfTriggeringCells, and if the entry condition applicable for this event, i.e., the event corresponding with the eventId of the corresponding reportConfig within VarMeasConfig, is fulfilled for one or more applicable cells for all measurements after layer 3 filtering taken during timeToTrigger defined for this event within the VarMeasConfig:

3> If the VarMeasReportList does not include a measurement reporting entry for this measId (a first cell triggers the event):

4> include a measurement reporting entry within the VarMeasReportList for this measId;

3> If the number of cell(s) in the cellsTriggeredList is larger than or equal to numberOfTriggeringCells:

4> include the concerned cell(s) in the cellsTriggeredList defined within the VarMeasReportList for this measId;

3> else:

4> include the concerned cell(s) in the cellsTriggeredList defined within the VarMeasReportList for this measId;

4> If the number of cell(s) in the cellsTriggeredList is larger than or equal to numberOfTriggeringCells:

5> set the numberOfReportsSent defined within the VarMeasReportList for this measId to 0;

5> initiate the measurement reporting procedure, as specified in 5.5.5;

When the entry condition for EventA3 for cell 1, cell 2, and/or cell 3 are satisfied, the UE may include cell 1, cell 2, and/or cell 3 in the cellTriggeredCellList. When the number of cells included in cellTriggeredCellList is larger than or equal to numberOfTriggeringCells, the UE may initiate a measurement reporting procedure according to an above-described embodiment (e.g., any one of FIGS. 1E to 1H). The UE may run the prohibit timer.

In operation 1*i*-25, the UE may transmit a measurement report to the base station according to an above-described embodiment (e.g., any one of FIGS. 1E to 1H).

In operation 1*i*-30, the UE may decide (identify or check) whether a measurement report should be triggered, based on the measurement configuration information received in operation 1*i*-15. That is, the UE may include cell 1, cell 2, cell 3, and/or cell 4 in the cellTriggeredCellList when the entry condition for EventA3 for cell 1, cell 2, cell 3, and/or cell 4 are satisfied. In the disclosure, when the prohibit timer is running, the UE may not transmit the measurement report to the base station. However, under a specific condition (e.g., when a specific event condition is satisfied or when the number of cells simultaneously satisfying a specific event condition is larger than or equal to a predetermined threshold value), the UE may transmit a measurement report even if the prohibit timer is running. For example, under specific conditions, transmission of the measurement report may be triggered regardless of whether the prohibit timer is running. Alternatively, under a specific condition, the UE may consider (identify or determine) that the prohibit timer is not running and transmit a measurement report to the base station.

In operation 1*i*-35, the UE may decide (identify or check) whether a measurement report should be triggered, based on the measurement configuration information received in operation 1*i*-15. That is, the UE may include cell 1, cell 2, cell 3, and/or cell 4 in the cellTriggeredCellList when the entry condition for EventA3 for cell 1, cell 2, cell 3, and/or cell 4 are satisfied. If the prohibit timer is not running, a measurement report start procedure may be performed. That is, in case that, while the prohibit timer is not running, the cellTriggeredList for which the measurement report start procedure is previously triggered is different from the current cellTriggeredList, and the entry condition for EventA3 is satisfied, the UE may trigger the measurement report initiation procedure. The UE may run the prohibit timer.

In operation 1*i*-40, the UE may transmit a measurement report to the base station.

In operation 1*i*-45, the UE may decide (identify or check) whether the measurement report should be triggered, based on the measurement configuration information received in operation 1*i*-15. That is, the UE may include cell 1, cell 2, and/or cell 3 in the cellTriggeredCellList when the entry condition for EventA3 for cell 1, cell 2, and/or cell 3 are satisfied. That is, cell4 may be excluded from the cellTriggeredCellList. At this time, the UE may trigger the measurement report even if the prohibit timer is running.

In operation 1*i*-50, the UE may transmit a measurement report to the base station.

In the disclosure, when the entry condition for an event including numberOfTriggeringCells are satisfied, the UE may initiate a measurement reporting procedure and transmit a measurement report to the base station when the following conditions are satisfied:

If the current cellsTriggeredList are superset of the one triggered in the latest MR and prohibit timer is not running, UE reports MR if triggering entry condition remains fulfilled. If the previous cellsTriggeredList in the latest MR is not subset of the current cellsTriggeredList, UE reports MR regardless of whether prohibit timer is running or not.

An embodiment of the disclosure may be applied together with an above-described embodiment (e.g., any one of FIGS. 1E to 1H).

Figure 1J:
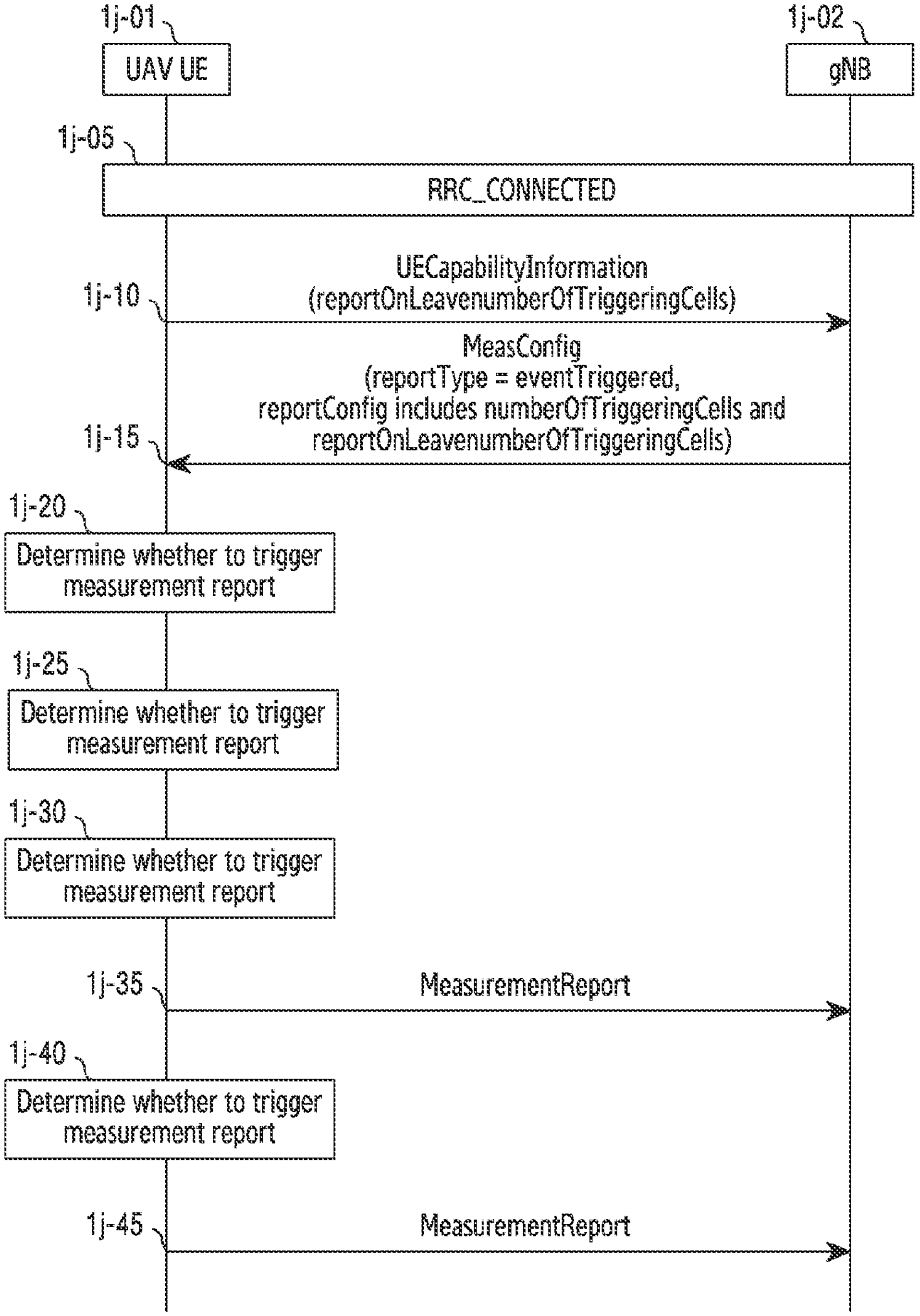
FIG. 1J is a flow diagram illustrating a process in which a UAV UE efficiently transmits a measurement report to a base station in a mobile communication system, according to an embodiment.

FIG. 1J is a flow diagram illustrating a process in which a UAV UE efficiently transmits a measurement report to a base station in a mobile communication system, according to an embodiment.

Referring to FIG. 1J, a UAV UE 1*j*-01 may be in an RRC connected mode (RRC_CONNECTED) by establishing an RRC connection with an NR base station 1*j*-02.

In operation 1*j*-10, the UE may transmit a UE capability information message (UECapabilityInformation) to the base station. A method of transmitting a UE capability information message (UECapabilityInformation) may follow an above-described embodiment. Additionally, the following parameter may be stored in the message.

reportOnLeavenumberOfTriggeringCells: indicates whether, in case of an event to which numberOfTriggeringCells is applied, the UE is capable of initiating a measurement report when the following leaving conditions are satisfied only in case that the UE initiates the measurement report to the base station according to satisfaction of the entry condition.

2> if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:

3> remove the concerned cell(s) in the cellsTriggeredList defined within the VarMeasReportList for this measId;

In operation 1*j*-15, the base station may transmit a predetermined RRC message (e.g., RRCResume or RRCReconfiguration) including measurement configuration information (MeasConfig) to the UE. A method of transmitting the predetermined RRC message (e.g., RRCResume or RRCReconfiguration) may follow an above-described embodiment (e.g., any one of FIGS. 1E to 1I). For convenience of explanation, the base station may configure numberOfTriggeringCells to be 3, and may configure eventTriggered to be EventA3 (e.g., one of EventA4, EventA5, EventB1, and EventB2, or may be configured as another event to which numberOfTriggeringCells is applied). Herein, reportOnLeaveNumberOfTriggeringCells may be included in the measurement configuration information.

In operation 1*j*-20, the UE may decide (identify or check) whether a measurement report should be triggered, based on the measurement configuration information received in operation 1*j*-15. Specifically, the UE may decide (identify, or check) whether the following conditions are satisfied:

2> if the reportType is set to eventTriggered and if the corresponding reportConfig includes numberOfTriggeringCells, and if the entry condition applicable for this event, i.e., the event corresponding with the eventId of the corresponding reportConfig within VarMeasConfig, is fulfilled for one or more applicable cells for all measurements after layer 3 filtering taken during timeToTrigger defined for this event within the VarMeasConfig:

3> If the VarMeasReportList does not include a measurement reporting entry for this measId (a first cell triggers the event):

4> include a measurement reporting entry within the VarMeasReportList for this measId;

3> If the number of cell(s) in the cellsTriggeredList is larger than or equal to numberOfTriggeringCells:

4> include the concerned cell(s) in the cellsTriggeredList defined within the VarMeasReportList for this measId;

3> else:

4> include the concerned cell(s) in the cellsTriggeredList defined within the VarMeasReportList for this measId;

4> If the number of cell(s) in the cellsTriggeredList is larger than or equal to numberOfTriggeringCells:

5> set the numberOfReportsSent defined within the VarMeasReportList for this measId to 0;

5> initiate the measurement reporting procedure, as specified in 5.5.5;

The UE may include cell 1 and/or cell 2 in cellTriggeredCellList when cell 1 and/or cell 2 satisfy the entry condition for EventA3. When the number of cells included in the cellTriggeredCellList is smaller than the numberOfTriggeringCells, the UE may not initiate the measurement reporting procedure according to an above-described embodiment (e.g., any one of FIGS. 1E to 1I).

In operation 1*j*-25, the UE may decide (identify or check) whether a measurement report should be triggered, based on the measurement configuration information received in operation 1*j*-15. Specifically, the UE may decide (identify, or check) whether the following conditions are satisfied:

2> if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:

3> remove the concerned cell(s) in the cellsTriggeredList defined within the VarMeasReportList for this measId;

3> if reportOnLeavenumberOfTriggeringCells is set to true for the corresponding reporting configuration and if the measurement reporting procedure was initiated due to the entry condition:

4> initiate the measurement reporting procedure, as specified in 5.5.5;

That is, in operation 1*j*-20, the UE did not initiate the measurement reporting procedure because the cell list included in the cellTriggeredList is less than numberOfTriggeringCells according to satisfaction of the entry condition, the UE may not initiate the measurement reporting procedure even if the leaving condition is satisfied. Therefore, the UE may reduce the overhead of transmitting a measurement report to the base station. In other words, instead of always initiating a measurement reporting procedure when the leaving condition is satisfied for an event to which numberOfTriggeringCells is applied, the UE may refrain from initiating the measurement reporting procedure when the leaving condition is satisfied only in case that the UE has initiated the measurement reporting procedure according to the satisfaction of the entry condition.

In operation 1*j*-30, the UE may decide (identify or check) whether a measurement report should be triggered, based on the measurement configuration information received in operation 1*j*-15. Specifically, the UE may decide (identify, or check) whether the following conditions are satisfied:

2> if the reportType is set to eventTriggered and if the corresponding reportConfig includes numberOfTriggeringCells, and if the entry condition applicable for this event, i.e., the event corresponding with the eventId of the corresponding reportConfig within VarMeasConfig, is fulfilled for one or more applicable cells for all measurements after layer 3 filtering taken during timeToTrigger defined for this event within the VarMeasConfig:

3> If the VarMeasReportList does not include a measurement reporting entry for this measId (a first cell triggers the event):

4> include a measurement reporting entry within the VarMeasReportList for this measId;

3> If the number of cell(s) in the cellsTriggeredList is larger than or equal to numberOfTriggeringCells:

4> include the concerned cell(s) in the cellsTriggeredList defined within the VarMeasReportList for this measId;

3> else:

4> include the concerned cell(s) in the cellsTriggeredList defined within the VarMeasReportList for this measId;

4> If the number of cell(s) in the cellsTriggeredList is larger than or equal to numberOfTriggeringCells:

5> set the numberOfReportsSent defined within the VarMeasReportList for this measId to 0;

5> initiate the measurement reporting procedure, as specified in 5.5.5;

The UE may include cell 1, cell 2, and/or cell 3 in cellTriggeredCellList when cell 1, cell 2, and/or cell 3 satisfy the entry condition for EventA3. When the number of cells included in cellTriggeredCellList is larger than or equal to numberOfTriggeringCells, the UE may initiate a measurement reporting procedure according to an above-described embodiment (e.g., any one of FIGS. 1E to 1I).

In operation 1*j*-35, the UE may transmit a measurement report to the base station according to an above-described embodiment (e.g., any one of FIGS. 1E to 1I).

In operation 1*j*-40, the UE may decide (identify or check) whether a measurement report should be triggered, based on the measurement configuration information received in operation 1*j*-15. Specifically, the UE may decide (identify, or check) whether the following conditions are satisfied:

2> if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:

3> remove the concerned cell(s) in the cellsTriggeredList defined within the VarMeasReportList for this measId;

3> if reportOnLeavenumberOfTriggeringCells is set to true for the corresponding reporting configuration and if the measurement reporting procedure was initiated due to the entry condition:

4> initiate the measurement reporting procedure, as specified in 5.5.5;

The UE may initiate a measurement reporting procedure when there is a cell that satisfies the leaving condition.

In operation 1j-45, the UE may transmit a measurement report to the base station according to an above-described embodiment (e.g., any one of FIGS. 1E to 1I).

An embodiment of the disclosure may be applied together with an above-described embodiment (e.g., any one of FIGS. 1E to 1I).

Figure 1K:
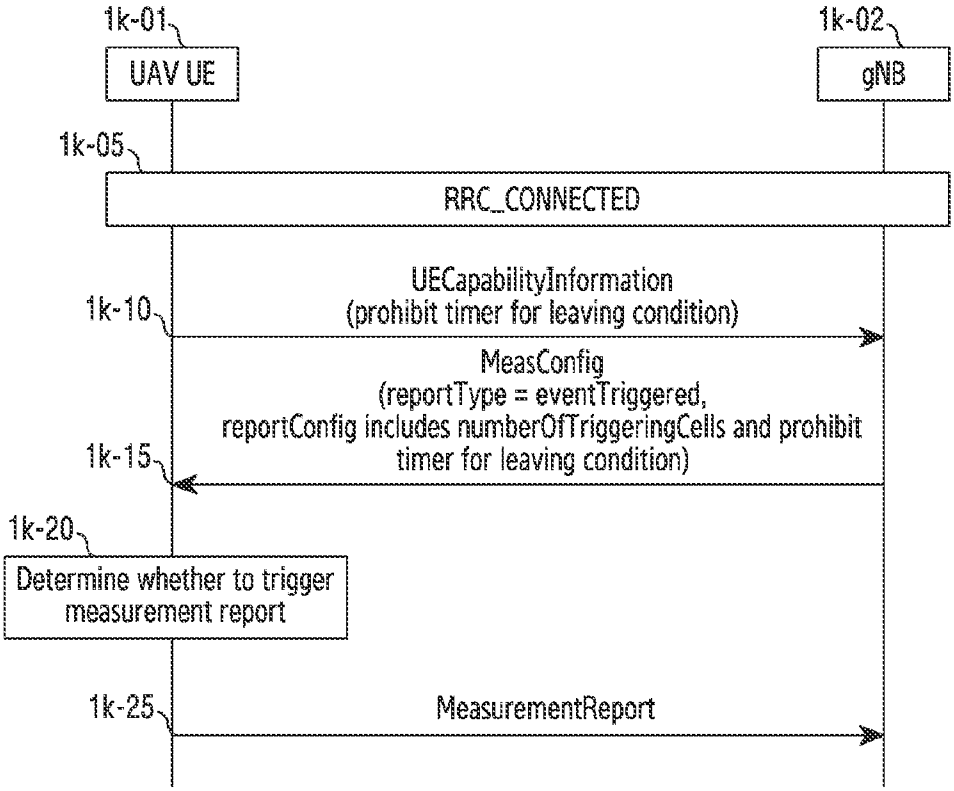
FIG. 1K is a flow diagram illustrating a process in which a UAV UE efficiently transmits a measurement report to a base station in a mobile communication system, according to an embodiment.

FIG. 1K is a flow diagram illustrating a process in which a UAV UE efficiently transmits a measurement report to a base station in a mobile communication system, according to an embodiment.

Referring to FIG. 1K, a UAV UE 1k-01 may be in an RRC connected mode (RRC_CONNECTED) by establishing an RRC connection with an NR base station 1k-02.

In operation 1k-10, the UE may transmit a UE capability information message (UECapabilityInformation) to the base station. A method of transmitting the UE capability information message (UECapabilityInformation) may follow an above-described embodiment (e.g., any one of FIGS. 1E to 1J). Additionally, the following parameter may be stored in the message.

A prohibition timer according to leaving conditions: indicates whether, in case of an event to which numberOfTriggeringCells is applied, the UE is capable of initiating a measurement report when the following leaving conditions are satisfied and the prohibit timer is not running.

2> if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:

3> remove the concerned cell(s) in the cellsTriggeredList defined within the VarMeasReportList for this measId;

3> if reportOnLeave is set to true for the corresponding reporting configuration In operation 1k-15, the base station may transmit a predetermined RRC message (e.g., RRCResume or RRCReconfiguration) including measurement configuration information (MeasConfig) to the UE. A method of transmitting the predetermined RRC message (e.g., RRCResume or RRCReconfiguration) may follow an above-described embodiment (e.g., any one of FIGS. 1E to 1J). For convenience of explanation, the base station may configure numberOfTriggeringCells to be 3, and may configure eventTriggered to be EventA3 (e.g., one of EventA4, EventA5, EventB1, and EventB2, or may be configured as another event to which numberOfTriggeringCells is applied). Herein, the measurement configuration information may be configured with a prohibit timer value applied to a leaving condition of an event to which numberOfTriggeringCells is applied. The prohibit timer value may be configured to be a value less than or equal to reportInterval. Alternatively, the prohibit timer value may be configured to be a value scaled to reportInterval or configured to be a value of x to be scaled (e.g., 0.2). When a value to be scaled is configured, the UE may configure the prohibit timer value to x *reportInterval. In case that the prohibition timer value is not configured, the UE may operate as in an above-described embodiment (e.g., any one of FIGS. 1E to 1J), or may decide (identify or check) that the prohibition timer value is configured as a default value. Alternatively, transmission of the measurement report may be triggered under a specific condition (e.g., when a specific event condition is satisfied or when the number of cells simultaneously satisfying a specific event condition is larger than or equal to a predetermined threshold value) regardless of whether the prohibit timer is running. Alternatively, under a specific condition, the UE may consider (identify or determine) that the prohibit timer is not running. In case that the UE supports the prohibit timer, the UE may operate according to any one of the operations described above in the following stages. However, the operation of the UE is not limited to the above-described operation methods, and may further include an additional operation considering the prohibit timer.

In operation 1k-20, the UE may decide (identify or check) whether a measurement report should be triggered, based on the measurement configuration information received in operation 1k-15. For example, the cell list included in cellTriggeredList may follow an above-described embodiment (e.g., any one of FIGS. 1E to 1J). The UE may decide (identify or check) whether the following leaving conditions are satisfied:

2> if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:

3> remove the concerned cell(s) in the cellsTriggeredList defined within the VarMeasReportList for this measId;

3> if reportOnLeave is set to true for the corresponding reporting configuration At this time, if the prohibit timer according to the leaving condition is running, the UE may not initiate a measurement reporting procedure. That is, when the prohibit timer is not running, the UE may initiate the measurement reporting procedure when the condition is satisfied and transmit the measurement report to the base station 1k-25. When the UE initiates the measurement reporting procedure, the prohibit timer may be run or re-run.

An embodiment of the disclosure may be applied together with an above-described embodiment (e.g., any one of FIGS. 1E to 1J).

Figure 1L:
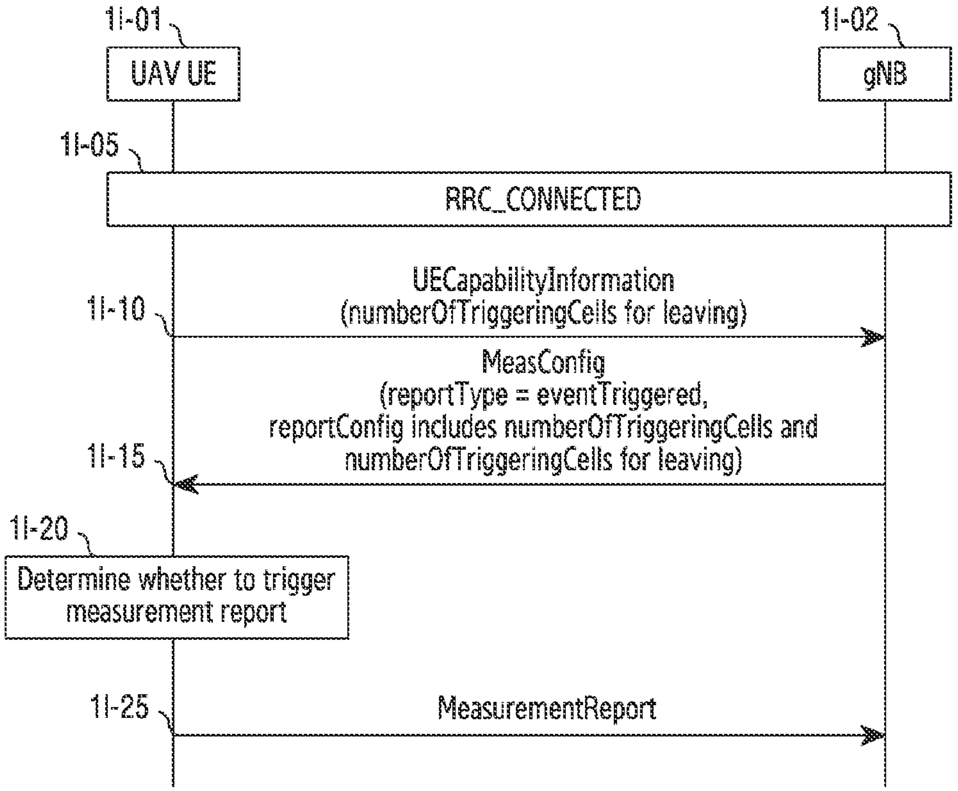
FIG. 1L is a flow diagram illustrating a process in which a UAV UE efficiently transmits a measurement report to a base station in a mobile communication system, according to an embodiment.

FIG. 1L is a flow diagram illustrating a process in which a UAV UE efficiently transmits a measurement report to a base station in a mobile communication system, according to an embodiment.

Referring to FIG. 1l, a UAV UE 1l-01 may be in an RRC connected mode (RRC_CONNECTED) by establishing an RRC connection with an NR base station 1l-02.

In operation 1l-10, the UE may transmit a UE capability information message (UECapabilityInformation) to the base station. A method of transmitting the UE capability information message (UECapabilityInformation) may follow an above-described embodiment (e.g., any one of FIGS. 1E to 1K). Additionally, the following parameter may be stored in the message:

numberOfTriggeringCells for leaving: indicates whether, in case of an event to which numberOfTriggeringCells is an applied, the UE is capable of initiating a measurement report only when the number of cells satisfying the following leaving condition is larger than or equal to the numberOfTriggeringCells.

In this case, reportOnLeave may not be configured.

2> if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:

3> remove the concerned cell(s) in the cellsTriggeredList defined within the VarMeasReportList for this measId;

3> if reportOnLeave is set to true for the corresponding reporting configuration In operation 1l-15, the base station may transmit a predetermined RRC message (e.g., RRCResume or RRCReconfiguration) including measurement configuration information (MeasConfig) to the UE. A method of transmitting the predetermined RRC message (e.g., RRCResume or RRCReconfiguration) may follow an above-described embodiment (e.g., any one of FIGS. 1E to 1K). For convenience of explanation, the base station may configure numberOfTriggeringCells to be 3, and configure eventTriggered to be EventA3 (e.g., one of EventA4, EventA5, EventB1, and EventB2, or may be configured as another event to which numberOfTriggeringCells is applied). Herein, numberOfTriggeringCells for leaving, which is applied to the leaving condition of an Event to which numberOfTriggeringCells is applied, may be configured in the measurement configuration information. That is, the UE may trigger the measurement report only when cells satisfying the leaving condition among the cells included in the cellTriggeredList are greater than or equal to the numberOfTriggeringCells for leaving.

In operation 1l-20, the UE may decide (identify or check) whether a measurement report should be triggered, based on the measurement configuration information received in operation 1l-15. The cell list included in cellTriggeredList may follow an above-described embodiment (e.g., any one of FIGS. 1E to 1K). The UE may decide (identify or check) whether the number of cells satisfying the following leaving condition is larger than or equal to the numberOfTriggeringCells for leaving.

2> if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:

3> remove the concerned cell(s) in the cellsTriggeredList defined within the VarMeasReportList for this measId;

3> if reportOnLeave is set to true for the corresponding reporting configuration When the number of cells satisfying the following leaving condition is larger than or equal to the numberOfTriggeringCells for leaving, the UE may initiate a measurement reporting procedure and transmit a measurement report to the base station 1l-25.

An embodiment of the disclosure may be applied together with an above-described embodiment (e.g., any one of FIGS. 1E to 1K).

Figure 1M:
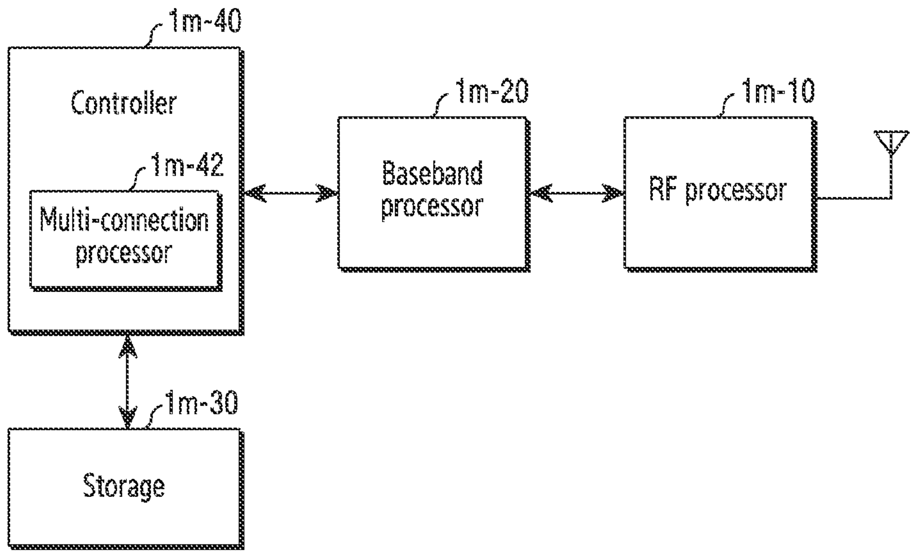
FIG. 1M is a block diagram illustrating an internal structure of a terminal, according to an embodiment.

FIG. 1M is a block diagram illustrating an internal structure of a terminal, according to an embodiment.

Referring to FIG. 1M, the terminal may include an RF processor 1m-10, a baseband processor 1m-20, a storage 1m-30, and/or a controller 1m-40.

The RF processor 1m-10 may perform a function for transmitting and/or receiving a signal via a wireless channel, such as band conversion and amplification of the signal. That is, the RF processor 1m-10 may up-convert a baseband signal provided from the baseband processor 1m-20 to an RF band signal and then transmits the same through an antenna, and may down-convert an RF band signal received through the antenna to a baseband signal. For example, the RF processor 1m-10 may include a transmission filter, a reception filter, an amplifier, a mixer, an oscillator, a digital-to-analog converter (DAC), an analog-to-digital converter (ADC), etc. The above-described components of the RF processor 1m-10 are only examples, and the RF processor 1m-10 may further include other components or may omit some of the above-described components. In FIG. 1M, although only one antenna is illustrated, the terminal may have multiple antennas. In addition, the RF processor 1m-10 may include a plurality of RF chains. Furthermore, the RF processor 1m-10 may perform beamforming. For the beamforming, the RF processor 1m-10 may adjust the phase and magnitude of each of signals transmitted and/or received through multiple antennas or antenna elements. In addition, the RF processor may perform MIMO, and may receive multiple layers when performing MIMO operations.

The baseband processor 1m-20 may perform a function of conversion between a baseband signal and a bit stream according to the physical layer standard of a system. For example, during data transmission, the baseband processor 1m-20 may generate complex symbols by encoding and modulating a transmission bit stream. In addition, upon receiving data, the baseband processor 1m-20 may restore the received bit stream through demodulation and decoding of the baseband signal provided from the RF processor 1m-10. For example, in the case of conforming to an OFDM method, when transmitting data, the baseband processor 1m-20 may encode and modulate a transmission bit stream to generate complex symbols, map the complex symbols to subcarriers, and then configure OFDM symbols via an inverse fast Fourier transform (IFFT) operation and cyclic prefix (CP) insertion. In addition, when receiving data, the baseband processor 1m-20 may divide the baseband signal provided from the RF processor 1m-10 into units of OFDM symbols, restore signals mapped to subcarriers via the fast Fourier transform (FFT) operation, and then restore a received bit stream via demodulation and decoding.

The baseband processor 1m-20 and the RF processor 1m-10 may transmit and/or receive signals as described above. Accordingly, each of the baseband processor 1m-20 and the RF processor 1m-10 may be referred to as a transmitter, a receiver, a transceiver, or a communicator. Furthermore, at least one of the baseband processor 1m-20 and the RF processor 1m-10 may include a plurality of communication modules to support a plurality of different radio access technologies. In addition, at least one of the baseband processor 1m-20 and the RF processor 1m-10 may include different communication modules to process signals in different frequency bands. For example, the different radio access technologies may include a wireless local area network (LAN) (e.g., IEEE 802.11), a cellular network (e.g., LTE), and the like. In addition, the different frequency bands may include a super-high-frequency (SHF) (e.g., 2.NRHz, NRhz) band and a millimeter-wave (e.g., 60 GHz) band. The terminal may transmit and/or receive a signal to/from the base station by using the baseband processor 1m-20 and the RF processor 1m-10, and the signal may include control information and data.

The storage 1m-30 may store data such as a basic program, an application, or configuration information for the operation of the UE. In particular, the storage 1m-30 may store information related to a second access node, which performs wireless communication using the second wireless access technology. In addition, the storage 1*m*-30 may provide stored data in response to a request from the controller 1*m*-40. The storage 1*m*-30 may be configured by a storage medium, such as a ROM, a RAM, a hard disk, a CD-ROM, and a DVD, or a combination of storage media. In addition, the storage 1*m*-30 may include multiple memories.

The controller 1*m*-40 may control the overall operation of the UE. For example, the controller 1*m*-40 may transmit and/or receive signals through the baseband processor 1*m*-20 and the RF processor 1*m*-10. In addition, the controller 1*m*-40 records and reads data in and from the storage 1*m*-30. To this end, the controller 1*m*-40 may include at least one processor. For example, the controller 1*m*-40 may include a communication processor that performs control for communication and an application processor (AP) that controls a higher layer such as an application. In addition, the controller 1*m*-40 may include a multi-connection processor 1*m*-42 configured to handle a process operating in multiple connection mode. In addition, at least one component of the terminal may be implemented as one chip.

Figure 1N:
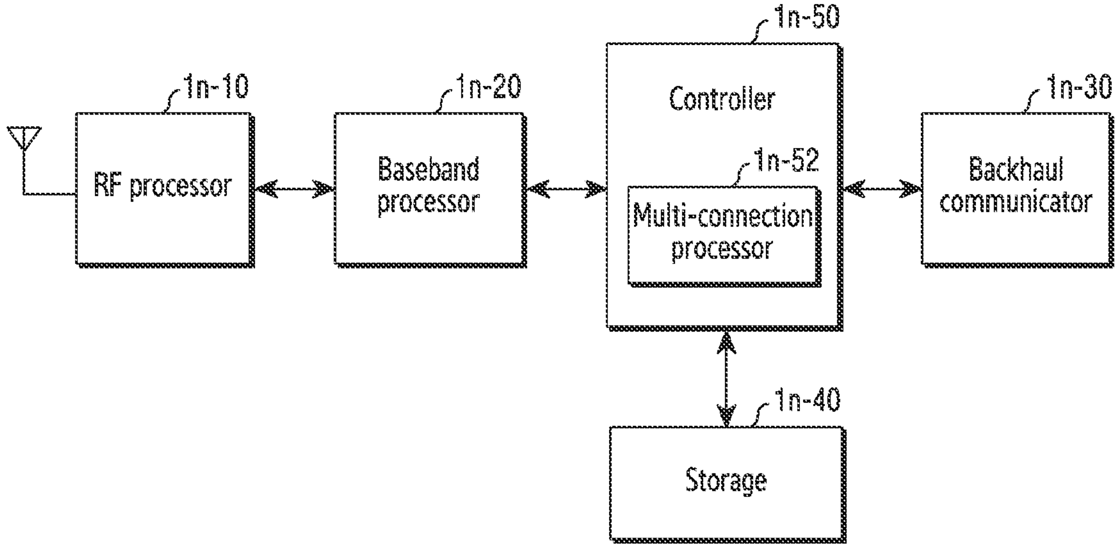
FIG. 1N is a block diagram illustrating a configuration of an NR base station, according to an embodiment.

FIG. 1N is a block diagram illustrating a configuration of an NR base station, according to an embodiment.

As illustrated, the base station may include an RF processor 1*n*-10, a baseband processor 1*n*-20, a backhaul communicator 1*n*-30, a storage 1*n*-40, and/or a controller 1*n*-50. Components included in the base station are not limited to the above-described components, and the base station may omit some of the components shown in FIG. 1N or may include additional components.

The RF processor 1*n*-10 may perform a function for transmitting and/or receiving a signal via a wireless channel, such as band conversion and amplification of the signal. That is, the RF processor 1*n*-10 may up-convert a baseband signal provided from the baseband processor 1*n*-20 to an RF band signal and then transmit the same through an antenna, and down-convert an RF band signal received through the antenna to a baseband signal. For example, the RF processor 1*n*-10 may include a transmission filter, a reception filter, an amplifier, a mixer, an oscillator, a DAC, and/or an analog-to-digital converter (ADC), etc. In FIG. 1N, although only one antenna is illustrated, a first connection node or base station may have multiple antennas. In addition, the RF processor 1*n*-10 may include a plurality of RF chains. Furthermore, the RF processor 1*n*-10 may perform beamforming. For the beamforming, the RF processor 1*n*-10 may adjust the phase and magnitude of each of signals transmitted and/or received through multiple antennas or antenna elements. The RF processor may perform down-MIMO operations by transmitting one or more layers.

The baseband processor 1*n*-20 may perform a function of conversion between a baseband signal and a bit stream according to the physical layer standard of a first radio access technology. For example, during data transmission, the baseband processor 1*n*-20 may generate complex symbols by encoding and modulating a transmission bit stream. In addition, upon receiving data, the baseband processor 1*n*-20 may restore the received bit stream through demodulation and decoding of the baseband signal provided from the RF processor 1*n*-10. For example, in a case of conforming to the OFDM method, when transmitting data, the baseband processor 1*n*-20 may encode and modulate a transmission bit stream to generate complex symbols, map the complex symbols to subcarriers, and then configure OFDM symbols via an IFFT operation and CP insertion. In addition, when receiving data, the baseband processor 1*n*-20 may divide the baseband signal provided from the RF processor 1*n*-10 into units of OFDM symbols, restore signals mapped to subcarriers via the FFT operation, and then restore a received bit stream via demodulation and decoding. The baseband processor 1*n*-20 and the RF processor 1*n*-10 transmit and/or receive signals as described above. Accordingly, each of the baseband processor 1*n*-20 and the RF processor 1*n*-10 may be referred to as a transmitter, a receiver, a transceiver, or a wireless communicator. The base station may transmit and/or receive a signal to/from a terminal by using the baseband processor 1*m*-20 and the RF processor 1*m*-10, and the signal may include control information and data.

The backhaul communicator 1*n*-30 may provide an interface for performing communication with other nodes in a network. That is, the backhaul communicator 1*n*-30 may convert a bit stream transmitted from a main base station to another node, for example, an auxiliary base station or a core network, into a physical signal, and convert the physical signal received from the other node into a bit stream. The backhaul communicator 1*n*-30 may be included in the communicator.

The storage 1*n*-40 may store data such as a basic program, an application, and configuration information for the operation of the main base station. In particular, the storage 1*n*-40 may store information on bearers allocated to the connected terminal, measurement results reported from the connected terminal, and the like. In addition, the storage 1*n*-40 may store information serving as a criterion for determining whether to provide or stop multiple connections to the terminal. In addition, the storage 1*n*-40 may provide stored data in response to a request from the controller 1*n*-50. The storage 1*m*-30 may be configured by a storage medium, such as a ROM, a RAM, a hard disk, a CD-ROM, and a DVD, or a combination of storage media. In addition, the storage 1*m*-30 may include multiple memories.

The controller 1*n*-50 may control the overall operation of the main base station. For example, the controller 1*n*-50 may transmit and/or receive signals through the baseband processor 1*n*-20 and the RF processor 1*n*-10 or through the backhaul communicator 1*n*-30. In addition, the controller 1*n*-50 records and reads data in and from the storage 1*n*-40. To this end, the controller 1*n*-50 may include at least one processor. In addition, the controller 1*n*-50 may include a multi-connection processor 1*n*-52 configured to handle a process operating in multiple connection mode. In addition, at least one component of the base station may be implemented as one chip.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, a digital versatile disc (DVD) or other optical storage device, and a magnetic cassette. Alternatively, it may be stored to a memory combining part or all of those recording media. A plurality of memories may be included.

Also, the program may be stored in an attachable storage device accessible via a communication network such as interne, intranet, LAN, wide LAN (WLAN), or storage area network (SAN), or a communication network by combining these networks. Such a storage device may access a device which executes an embodiment of the disclosure through an external port. In addition, a separate storage device on the communication network may access the device which executes an embodiment.

Components included in the disclosure are expressed in a singular or plural form. However, the singular or plural expression is appropriately selected according to a proposed situation for the convenience of explanation, the disclosure is not limited to a single component or a plurality of components, the components expressed in the plural form may be configured as a single component, and the components expressed in the singular form may be configured as a plurality of components.

While embodiments have been described herein, various changes may be made therein without departing from the scope of the disclosure. Therefore, the scope of the disclosure is not limited and defined by the described embodiment and is defined not only the scope of the claims as below but also their equivalents.

The embodiments described and shown herein are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, a part of one embodiment of the disclosure may be combined with a part of another embodiment to operate a base station and a terminal. As an example, a part of a first embodiment may be combined with a part of a second embodiment to operate a base station and a terminal. Furthermore, variants based on the technical idea of the above embodiments may be implemented in systems such as frequency division duplexing (FDD) LTE, time division duplexing (TDD) LTE, 5G, or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Furthermore, in methods of the disclosure, some or all of the contents of each embodiment may be implemented in combination without departing from the essential spirit and scope of the disclosure.

Various embodiments of the disclosure have been described above. The above description of the disclosure is merely for the sake of illustration, and embodiments of the disclosure are not limited to the embodiments set forth herein. Those skilled in the art will appreciate that the disclosure may be easily modified and changed into other specific forms without departing from the technical idea or essential features of the disclosure. Therefore, the scope of the disclosure should be determined not by the above detailed description but by the appended claims, and all modification sand changes derived from the meaning and scope of the claims and equivalents thereof shall be construed as falling within the scope of the disclosure.

What is claimed is:

1. A method performed by a user equipment (UE) in a wireless communication system, the method comprising:

receiving, from a base station, configuration information on a measurement report, wherein the configuration information includes first information on a number of triggering cells and second information on a leaving condition for a cell;

initiating a first measurement reporting procedure for at least one first cell fulfilling an entry condition, in case that a number of the at least one first cell included in a cellsTriggeredList is larger than or equal to the number of triggering cells;

identifying at least one second cell fulfilling the leaving condition, wherein the at least one second cell is included in the cells TriggeredList;

removing the at least one second cell in the cellsTriggeredList based on an identification for the configuration information; and initiating a second measurement reporting procedure for at least one third cell in the cellsTriggeredList. in case that the second information is set to True and a measurement report for at least one cell among the at least one second cell was sent by the first measurement reporting procedure.

2. The method of claim 1, further comprising:

identifying whether the entry condition for at least one first cell is fulfilled based on the configuration information, wherein the at least one first cell in the cellsTriggeredList is included in a VarMeasReportList, and wherein the configuration information further includes information on the entry condition.

3. The method of claim 1, wherein the UE is an unmanned aerial vehicle (UAV) UE.

4. The method of claim 1, further comprising:

transmitting, to the base station, UE capability information including information indicating that the UE supports the number of triggering cells.

5. A method performed by a base station in a wireless communication system, the method comprising:

transmitting, to a user equipment (UE), configuration information on a measurement report, wherein the configuration information includes first information on a number of triggering cells and second information on a leaving condition for a cell;

receiving, from the UE, a first measurement report for at least one first cell fulfilling an entry condition, in case that a number of the at least one first cell included in a cellsTriggeredList is larger than or equal to the number of triggering cells; and receiving, from the UE, a second measurement report for at least one third cell in the cellsTriggeredList. in case that the second information is set to True and a measurement report for at least one cell among at least one second cell was sent in the first measurement report, wherein the at least one second cell fulfilling the leaving condition is included in the cellsTriggeredList.

6. The method of claim 5, wherein whether the entry condition for at least one first cell is fulfilled is based on the first information, wherein the at least one first cell in the cellsTriggeredList is included in a VarMeasReportList, and wherein the configuration information further includes information on the entry condition.

7. The method of claim 5, wherein the UE is an unmanned aerial vehicle (UAV) UE.

8. The method of claim 5, further comprising:

receiving, from the UE, UE capability information including information indicating that the UE supports the number of triggering cells.

9. A user equipment (UE) comprising:

at least one transceiver; and at least one processor communicatively coupled to the at least one transceiver; and at least one memory. communicatively coupled to the at least one processor, storing instructions executable by the at least one processor individually or in any combination to cause the UE to:

receive, from a base station, configuration information on a measurement report, wherein the configuration information includes first information on a number of triggering cells and second information on a leaving condition for a cell, initiate a first measurement reporting procedure for at least one first cell fulfilling an entry condition, in case that a number of the at least one first cell included in a cellsTriggeredList is larger than or equal to the number of triggering cells, identify at least one second cell fulfilling the leaving condition, wherein the at least one second cell is included in the cellsTriggeredList, remove the at least one second cell in the cellsTriggeredList based on an identification for the configuration information, and initiate a second measurement reporting procedure for at least one third cell in the cellsTriggeredList, in case that the second information is set to True and a measurement report for at least one cell among the at least one second cell was sent by the first measurement reporting procedure.

10. The UE of claim 9, wherein the instructions further cause the UE to:

identify whether the entry condition for at least one first cell is fulfilled based on the configuration information, wherein the at least one first cell in the cellsTriggeredList is included in a VarMeasReportList, and wherein the configuration information further includes information on the entry condition.

11. The UE of claim 9, wherein the UE is an unmanned aerial vehicle (UAV) UE.

12. The UE of claim 9, wherein the instructions further cause the UE to:

transmit, to the base station, UE capability information including information indicating that the UE supports the number of triggering cells.

13. A base station comprising:

at least one transceiver; and at least one processor communicatively coupled to the at least one transceiver; and at least one memory, communicatively coupled to the at least one processor, storing instructions executable by the at least one processor individually or in any combination to cause the base station to:

transmit, to a user equipment (UE), configuration information on a measurement report, wherein the configuration information includes first information on a number of triggering cells and second information on a leaving condition for a cell, receive, from the UE, a first measurement report for at least one first cell fulfilling an entry condition, in case that a number of the at least one first cell included in a cellsTriggeredList is larger than or equal to the number of triggering cells, and receive, from the UE, a second measurement report for at least one third cell in the cellsTriggeredList, in case that the second information is set to True and a measurement report for at least one cell among at least one second cell was sent in the first measurement report, wherein the at least one second cell fulfilling the leaving condition is included in the cellsTriggeredList.

14. The base station of claim 13, wherein whether the entry condition for at least one first cell is fulfilled is based on the first information, wherein the at least one first cell in the cellsTriggeredList is included in a VarMeasReportList, and wherein the configuration information further includes information on the entry condition.

15. The base station of claim 13, wherein the UE is an unmanned aerial vehicle (UAV) UE.

16. The base station of claim 13, wherein the instructions further cause the base station to:

receive, from the UE, UE capability information including information indicating that the UE supports the number of triggering cells.

* * * * *